United States Patent
Bhageshpur et al.

(10) Patent No.: US 12,481,625 B1
(45) Date of Patent: Nov. 25, 2025

(54) INTEGRATING FILE SYSTEM OPERATIONS WITH NETWORK INFRASTRUCTURE

(71) Applicant: Qumulo, Inc., Seattle, WA (US)

(72) Inventors: Kiran V. Bhageshpur, Seattle, WA (US); Edward Addison Carpenter, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 18/945,343

(22) Filed: Nov. 12, 2024

(51) Int. Cl.
G06F 12/00 (2006.01)
G06F 16/00 (2019.01)
G06F 16/182 (2019.01)

(52) U.S. Cl.
CPC .................. G06F 16/183 (2019.01)

(58) Field of Classification Search
None
See application file for complete search history.

(56) References Cited

U.S. PATENT DOCUMENTS

| | | |
|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,049,809 A | 4/2000 | Raman et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |

(Continued)

FOREIGN PATENT DOCUMENTS

| | | |
|---|---|---|
| CN | 116647491 A | 8/2023 |
| EP | 1217551 A2 | 6/2002 |

(Continued)

OTHER PUBLICATIONS

Office Communication for U.S. Appl. No. 18/070,705 mailed Feb. 22, 2024, 7 Pages.

(Continued)

*Primary Examiner* — Tuan A Pham
(74) *Attorney, Agent, or Firm* — John W. Branch; Branch Partners PLLC

(57) ABSTRACT

Embodiments manage data in a file system. A plurality of file system operations may be executed in the file system based on a file system client action or a file system administrative action such that the file system may be integrated with an infrastructure of the network that includes network devices. Messages associated with some of network devices may be employed to perform one or more actions, including: determining one or more file system operations of the plurality of file system operations that may be associated with the network devices based on the messages; modifying the infrastructure associated with the network devices in response to the messages or the one or more file system operations; modifying the one or more file system operations in response to the modified infrastructure; executing the one or more modified file system operations; or the like.

26 Claims, 14 Drawing Sheets

(56) References Cited

U.S. PATENT DOCUMENTS

| | | |
|---|---|---|
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,353,044 B1 | 1/2013 | Jones et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Tyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,396,202 B1 | 7/2016 | Drobychev et al. |
| 9,459,804 B1 | 10/2016 | Natanzon et al. |
| 9,501,487 B1 | 11/2016 | Yuan et al. |
| 9,519,664 B1 | 12/2016 | Kharatishvili et al. |
| 9,547,560 B1 | 1/2017 | Lee |
| 9,600,193 B2 | 3/2017 | Ahrens et al. |
| 9,613,120 B1 | 4/2017 | Kharatishvili et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B2 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 | 8/2019 | Kalush et al. |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B1 | 4/2020 | Rothschilds et al. |
| 10,614,241 B1 | 4/2020 | Kirby et al. |
| 10,621,057 B2 | 4/2020 | Tripathi et al. |
| 10,621,147 B1 | 4/2020 | Liang et al. |
| 10,628,391 B1 | 4/2020 | Bent et al. |
| 10,664,408 B1 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 10,938,650 B1 * | 3/2021 | Hermoni ............ G06F 16/1734 |
| 10,938,661 B1 * | 3/2021 | Pignataro ............ H04L 41/5045 |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 | 10/2021 | Gao et al. |
| 11,151,001 B2 | 10/2021 | Su et al. |
| 11,151,092 B2 | 10/2021 | Chmiel et al. |
| 11,157,458 B1 | 10/2021 | Carter et al. |
| 11,249,907 B1 | 2/2022 | Brewer |
| 11,256,682 B2 | 2/2022 | Taron et al. |
| 11,265,262 B1 | 3/2022 | Makie et al. |
| 11,290,425 B2 | 3/2022 | Newell et al. |
| 11,294,604 B1 | 4/2022 | McMullan et al. |
| 11,294,718 B2 | 4/2022 | Bai et al. |
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |
| 11,461,286 B2 | 10/2022 | Godman et al. |
| 11,567,660 B2 | 1/2023 | Chmiel et al. |
| 11,599,508 B1 | 3/2023 | Harward et al. |
| 11,630,832 B2 | 4/2023 | Choi et al. |
| 11,669,255 B2 | 6/2023 | Hansen et al. |
| 11,722,150 B1 | 8/2023 | Fachan et al. |

(56) References Cited

U.S. PATENT DOCUMENTS

| | | |
|---|---|---|
| 11,729,269 B1 | 8/2023 | Meernik et al. |
| 11,734,147 B2 | 8/2023 | Bai et al. |
| 11,775,481 B2 | 10/2023 | Unger et al. |
| 11,921,677 B1 | 3/2024 | Kirby et al. |
| 11,934,660 B1 | 3/2024 | McMullan et al. |
| 11,966,592 B1 | 4/2024 | Bai |
| 12,019,875 B1 | 6/2024 | McMullan et al. |
| 12,038,877 B1 | 7/2024 | Kirby et al. |
| 12,222,903 B1 | 2/2025 | Rothschilds et al. |
| 12,292,853 B1 | 5/2025 | Ellis et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil et al. |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | Macintyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0004914 A1 | 1/2011 | Ennis et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0153560 A1 | 6/2011 | Bryant et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0103778 A1 | 4/2013 | Hayashi et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0258657 A1 | 9/2014 | Schott et al. |
| 2014/0280485 A1 | 9/2014 | A Hummaida et al. |
| 2014/0280889 A1* | 9/2014 | Nispel ............... H04L 43/026 709/224 |
| 2014/0281307 A1 | 9/2014 | Peterson et al. |
| 2014/0281411 A1 | 9/2014 | Abdallah |

(56) References Cited

U.S. PATENT DOCUMENTS

| | | |
|---|---|---|
| 2014/0344222 A1 | 11/2014 | Morris et al. |
| 2014/0358356 A1 | 12/2014 | Jones et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193317 A1 | 7/2015 | Firley |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0269203 A1 | 9/2015 | Baldwin et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1 | 10/2015 | Passey et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0164916 A1* | 6/2016 | Satish ................ H04L 63/1425 |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0350363 A1 | 12/2016 | Raja et al. |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2016/0380913 A1 | 12/2016 | Morgan et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1* | 3/2018 | Mitkar ................ G06F 11/1451 |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | Mcbride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0201824 A1 | 6/2020 | Nishimoto et al. |
| 2020/0210385 A1 | 7/2020 | Carpenter et al. |
| 2020/0242075 A1 | 7/2020 | Davis et al. |
| 2020/0242082 A1 | 7/2020 | Chmiel et al. |
| 2020/0286270 A1 | 9/2020 | Lymperopoulos et al. |
| 2020/0341689 A1 | 10/2020 | Smith |
| 2020/0387315 A1 | 12/2020 | Sterns et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0132824 A1 | 5/2021 | Furuta et al. |
| 2021/0173588 A1 | 6/2021 | Kannan et al. |
| 2021/0191650 A1 | 6/2021 | Vansteenkiste et al. |
| 2021/0232427 A1 | 7/2021 | Bai et al. |
| 2021/0232464 A1 | 7/2021 | Su et al. |
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |
| 2022/0107729 A1 | 4/2022 | Hua |
| 2022/0124152 A1 | 4/2022 | Gallego et al. |
| 2022/0138150 A1 | 5/2022 | Chmiel et al. |

(56) References Cited

U.S. PATENT DOCUMENTS

| | | |
|---|---|---|
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |
| 2023/0004312 A1 | 1/2023 | Hansen et al. |
| 2023/0057068 A1 | 2/2023 | Bhandarkar et al. |
| 2023/0057600 A1 | 2/2023 | Malley et al. |
| 2023/0069434 A1 | 3/2023 | Cheng et al. |
| 2023/0106208 A1 | 4/2023 | Nossenson et al. |
| 2023/0342053 A1 | 10/2023 | Varghese et al. |
| 2024/0020268 A1 | 1/2024 | Haber et al. |
| 2024/0028596 A1 | 1/2024 | Lakshman et al. |
| 2025/0147924 A1 | 5/2025 | Ellis et al. |

FOREIGN PATENT DOCUMENTS

| | | |
|---|---|---|
| EP | 1498829 A1 | 1/2005 |
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 99/44145 A1 | 9/1999 |
| WO | 00/72201 A1 | 11/2000 |
| WO | 2009/007250 A2 | 1/2009 |
| WO | 2012/029259 A1 | 3/2012 |
| WO | 2016/205752 A1 | 12/2016 |
| WO | 2021/151107 A1 | 7/2021 |
| WO | 2021/189055 A2 | 9/2021 |
| WO | 2025/101416 A1 | 5/2025 |
| WO | 2025/101465 A1 | 5/2025 |

OTHER PUBLICATIONS

Office Communication for U.S. Appl. No. 18/070,705 mailed Mar. 5, 2024, 2 Pages.
Office Communication for U.S. Appl. No. 17/115,529 mailed Mar. 26, 2024, 27 Pages.
Office Communication for U.S. Appl. No. 18/583,746 mailed May 14, 2024, 21 Pages.
Office Communication for U.S. Appl. No. 18/590,088 mailed Apr. 24, 2024, 18 Pages.
Office Communication for U.S. Appl. No. 18/590,088 mailed May 2, 2024, 13 Pages.
Office Communication for U.S. Appl. No. 17/864,190 mailed Jun. 4, 2024, 12 Pages.
Marcus Jurgens, "Aggregated Data in Tree-Based Index Structures" in Index Structures for Data Warehouses, LNCS 1859, Springer, Year: 2002, pp. 43-62.
Office Communication for U.S. Appl. No. 18/503,082 mailed Feb. 29, 2024, 26 Pages.
Office Communication for U.S. Appl. No. 18/503,082 mailed May 15, 2024, 27 Pages.
Office Communication for U.S. Appl. No. 18/503,082 mailed Jun. 25, 2024, 4 Pages.
Office Communication for U.S. Appl. No. 18/503,082 mailed Sep. 6, 2024, 27 Pages.
Office Communication for U.S. Appl. No. 18/799,431 mailed Oct. 23, 2024, 30 Pages.
Office Communication for U.S. Appl. No. 18/799,431 mailed Nov. 6, 2024, 27 Pages.
Office Communication for U.S. Appl. No. 16/883,922 mailed Aug. 7, 2020, 13 Pages.
Office Communication for U.S. Appl. No. 16/775,041 mailed Aug. 18, 2020, 9 Pages.
Office Communication for U.S. Appl. No. 16/883,879 mailed Sep. 1, 2020, 11 Pages.
Extended European Search Report for European Patent Application No. 16812585.4 mailed Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 mailed Jan. 2, 2020, 6 Pages.
International Search Report and Written Opinion for International Patent Application No. PCT/US2016/038242 mailed Oct. 11, 2016, 9 Pages.
Office Communication for U.S. Appl. No. 14/595,598 mailed Jul. 31, 2019, 5 Pages.
Office Communication for U.S. Appl. No. 14/595,598 mailed Sep. 20, 2018, 18 Pages.
Office Communication for U.S. Appl. No. 14/595,598 mailed Dec. 15, 2017, 18 Pages.
Office Communication for U.S. Appl. No. 14/595,598 mailed Feb. 24, 2017, 8 Pages.
Office Communication for U.S. Appl. No. 14/595,598 mailed Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 mailed Aug. 24, 2020, 7 Pages.
Office Communication for European Patent Application No. 18155779.4 mailed Oct. 8, 2019, 4 Pages.
Office Communication for U.S. Appl. No. 16/152,259 mailed Aug. 28, 2020, 5 Pages.
Office Communication for U.S. Appl. No. 16/752,509 mailed Aug. 11, 2020, 7 Pages.
Office Communication for U.S. Appl. No. 14/595,598 mailed Sep. 25, 2020, 7 Pages.
Office Communication for U.S. Appl. No. 16/152,277 mailed Oct. 16, 2020, 10 Pages.
Office Communication for U.S. Appl. No. 16/152,615 mailed Oct. 20, 2020, 7 Pages.
Office Communication for U.S. Appl. No. 16/775,041 mailed Nov. 3, 2020, 5 Pages.
Office Communication for U.S. Appl. No. 17/062,500 mailed Nov. 12, 2020, 12 Pages.
Office Communication for U.S. Appl. No. 16/004,182 mailed Nov. 30, 2020, 55 Pages.
Office Communication for U.S. Appl. No. 14/859,114 mailed Dec. 1, 2020, 24 Pages.
Office Communication for U.S. Appl. No. 16/883,922 mailed Dec. 2, 2020, 9 Pages.
Office Communication for U.S. Appl. No. 16/883,879 mailed Dec. 8, 2020, 5 Pages.
Office Communication for U.S. Appl. No. 16/152,277 mailed Dec. 28, 2020, 5 Pages.
Office Communication for U.S. Appl. No. 16/004,182 mailed Jan. 28, 2021, 4 Pages.
Office Communication for U.S. Appl. No. 14/595,598 mailed Feb. 4, 2021, 19 Pages.
Office Communication for U.S. Appl. No. 17/115,529 mailed Feb. 8, 2021, 15 Pages.
Office Communication for U.S. Appl. No. 16/262,756 mailed Feb. 10, 2021, 19 Pages.
Office Communication for U.S. Appl. No. 17/114,384 mailed Feb. 17, 2021, 12 Pages.
Office Action for European Patent Application No. 17206518.7 mailed Feb. 23, 2021, 6 Pages.
Office Communication for U.S. Appl. No. 14/859,114 mailed Mar. 8, 2021, 4 Pages.
Office Communication for U.S. Appl. No. 16/004,182 mailed Mar. 8, 2021, 60 Pages.
Office Communication for U.S. Appl. No. 17/062,500 mailed Mar. 9, 2021, 17 Pages.
Office Communication for U.S. Appl. No. 16/152,277 mailed Mar. 18, 2021, 10 Pages.
Office Communication for U.S. Appl. No. 17/160,698 mailed Mar. 18, 2021, 11 Pages.
Office Communication for U.S. Appl. No. 17/062,500 mailed May 18, 2021, 4 Pages.
Office Communication for U.S. Appl. No. 17/203,371 mailed May 20, 2021, 10 Pages.

(56) References Cited

OTHER PUBLICATIONS

Office Communication for U.S. Appl. No. 17/115,529 mailed May 25, 2021, 18 Pages.
Office Communication for U.S. Appl. No. 14/859,114 mailed May 26, 2021, 11 Pages.
Office Communication for U.S. Appl. No. 16/262,756 mailed May 27, 2021, 7 Pages.
Office Communication for U.S. Appl. No. 17/114,384 mailed May 27, 2021, 13 Pages.
Office Communication for U.S. Appl. No. 17/190,653 mailed May 27, 2021, 11 Pages.
Office Communication for U.S. Appl. No. 16/741,567 mailed Jun. 8, 2021, 5 Pages.
Office Communication for U.S. Appl. No. 17/203,452 mailed Jun. 23, 2021, 11 Pages.
Office Communication for U.S. Appl. No. 16/152,277 mailed Jun. 25, 2021, 10 Pages.
Office Communication for U.S. Appl. No. 16/004,182 mailed Jul. 1, 2021, 58 Pages.
Office Communication for U.S. Appl. No. 17/160,698 mailed Jul. 2, 2021, 12 Pages.
International Search Report and Written Opinion for International Patent Application No. PCT/US2021/023531 mailed Jul. 6, 2021, 6 Pages.
Office Communication for U.S. Appl. No. 17/062,500 mailed Jul. 12, 2021, 18 Pages.
Office Communication for U.S. Appl. No. 16/775,041 mailed Jul. 21, 2021, 11 Pages.
Office Communication for U.S. Appl. No. 17/114,384 mailed Aug. 3, 2021, 4 Pages.
Office Communication for U.S. Appl. No. 14/595,598 mailed Aug. 6, 2021, 20 Pages.
Office Communication for U.S. Appl. No. 17/115,529 mailed Aug. 12, 2021, 4 Pages.
Office Communication for U.S. Appl. No. 17/190,653 mailed Aug. 27, 2021, 11 Pages.
Office Communication for U.S. Appl. No. 17/114,384 mailed Sep. 2, 2021, 5 Pages.
Office Communication for U.S. Appl. No. 16/152,277 mailed Sep. 3, 2021, 4 Pages.
Office Communication for U.S. Appl. No. 16/004,182 mailed Sep. 10, 2021, 4 Pages.
Office Communication for U.S. Appl. No. 16/004,182 mailed Sep. 29, 2021, 11 Pages.
Office Communication for U.S. Appl. No. 17/491,017 mailed Dec. 23, 2021, 41 Pages.
Office Communication for U.S. Appl. No. 17/491,017 mailed May 12, 2022, 50 Pages.
Office Communication for U.S. Appl. No. 17/491,017 mailed Sep. 15, 2022, 55 Pages.
Office Communication for U.S. Appl. No. 17/491,017 mailed Feb. 10, 2023, 55 Pages.
Office Communication for U.S. Appl. No. 17/491,017 mailed Aug. 8, 2023, 13 Pages.
Office Communication for U.S. Appl. No. 14/595,598 mailed May 16, 2019, 18 Pages.
Office Communication for U.S. Appl. No. 16/152,277 mailed Oct. 26, 2021, 2 Pages.
Office Communication for U.S. Appl. No. 16/004,182 mailed Mar. 17, 2022, 3 Pages.
Office Communication for U.S. Appl. No. 16/226,587 mailed Jan. 27, 2020, 13 Pages.
Office Communication for U.S. Appl. No. 16/741,567 mailed Feb. 24, 2022, 2 Pages.
Office Communication for U.S. Appl. No. 16/234,334 mailed Oct. 11, 2019, 16 Pages.
Office Communication for U.S. Appl. No. 16/262,790 mailed Nov. 8, 2019, 5 Pages.
Office Communication for U.S. Appl. No. 17/504,289 mailed Apr. 20, 2022, 2 Pages.
Office Communication for U.S. Appl. No. 16/659,488 mailed May 6, 2020, 8 Pages.
International Preliminary Report on Patentability Chapter I for International Patent Application No. PCT/US2021/023531 mailed Aug. 4, 2022, 5 Pages.
International Preliminary Report on Patentability Chapter I for International Patent Application No. PCT/US2021/023525 mailed Aug. 4, 2022, 5 Pages.
International Preliminary Report on Patentability Chapter I for International Patent Application No. PCT/US2016/038242 mailed Dec. 28, 2017, 8 Pages.
Office Action for European Patent Application No. 17206518.7 mailed Mar. 15, 2022, 5 Pages.
Intention to Grant for European Patent Application No. 17206518.7 mailed Sep. 30, 2022, 6 Pages.
Office Communication for U.S. Appl. No. 17/508,869 mailed Mar. 8, 2022, 2 Pages.
Office Communication for U.S. Appl. No. 17/508,869 mailed Jan. 5, 2022, 3 Pages.
Office Communication for U.S. Appl. No. 17/508,869 mailed Dec. 22, 2021, 9 Pages.
Office Communication for U.S. Appl. No. 17/530,420 mailed May 4, 2022, 3 Pages.
Office Communication for U.S. Appl. No. 17/530,420 mailed May 12, 2022, 3 Pages.
Office Communication for European Patent Application No. 16812585.4 mailed Apr. 1, 2021, 9 pages.
Intention to Grant for European Patent Application No. 18155779.4 mailed Jun. 12, 2020, 10 Pages.
Office Communication for U.S. Appl. No. 17/115,529 mailed Sep. 12, 2023, 25 Pages.
Office Communication for U.S. Appl. No. 17/491,017 mailed May 4, 2023, 6 Pages.
Office Communication for U.S. Appl. No. 17/491,017 mailed Aug. 17, 2022, 5 Pages.
Office Communication for U.S. Appl. No. 17/864,190 mailed Aug. 25, 2023, 12 Pages.
Office Communication for U.S. Appl. No. 18/070,705 mailed Sep. 7, 2023, 5 Pages.
Office Communication for European Patent Application No. 18155779.4 mailed Apr. 17, 2018, 4 Pages.
Office Communication for U.S. Appl. No. 17/864,190 mailed Nov. 17, 2023, 12 Pages.
Office Communication for U.S. Appl. No. 17/115,529 mailed Dec. 13, 2023, 4 Pages.
Office Communication for U.S. Appl. No. 17/115,529 mailed Jan. 12, 2024, 26 Pages.
Office Communication for U.S. Appl. No. 18/503,791 mailed Jan. 4, 2024, 27 Pages.
Office Communication for U.S. Appl. No. 17/864,190 mailed Feb. 8, 2024, 5 Pages.
Office Communication for U.S. Appl. No. 18/503,918 mailed Jan. 24, 2024, 12 Pages.
Office Communication for U.S. Appl. No. 18/503,918 mailed Jan. 31, 2024, 8 Pages.
Office Communication for U.S. Appl. No. 17/062,500 mailed Oct. 27, 2021, 17 Pages.
Office Communication for U.S. Appl. No. 14/595,598 mailed Oct. 28, 2021, 6 Pages.
Office Communication for U.S. Appl. No. 16/741,567 mailed Oct. 28, 2021, 11 Pages.
Office Communication for U.S. Appl. No. 17/203,452 mailed Nov. 2, 2021, 13 Pages.
Office Communication for U.S. Appl. No. 17/190,653 mailed Nov. 10, 2021, 6 Pages.
Office Communication for U.S. Appl. No. 17/484,167 mailed Nov. 18, 2021, 15 Pages.
Office Communication for U.S. Appl. No. 17/504,289 mailed Dec. 7, 2021, 15 Pages.
Office Communication for U.S. Appl. No. 17/114,384 mailed Dec. 14, 2021, 7 Pages.
Office Communication for U.S. Appl. No. 16/226,587 mailed Aug. 5, 2019, 46 Pages.

(56) References Cited

OTHER PUBLICATIONS

Office Communication for U.S. Appl. No. 16/228,716 mailed Jun. 24, 2019, 10 Pages.
Office Communication for U.S. Appl. No. 16/231,354 mailed Jul. 10, 2019, 8 Pages.
Office Communication for U.S. Appl. No. 16/262,756 mailed Aug. 5, 2019, 35 Pages.
Office Communication for U.S. Appl. No. 15/967,499 mailed Jun. 27, 2018, 16 Pages.
Office Communication for U.S. Appl. No. 16/226,587 mailed Feb. 25, 2019, 43 Pages.
Office Communication for U.S. Appl. No. 16/228,716 mailed Feb. 28, 2019, 15 Pages.
Office Communication for U.S. Appl. No. 16/231,354 mailed Mar. 25, 2019, 10 Pages.
Office Communication for U.S. Appl. No. 16/262,756 mailed Apr. 2, 2019, 29 Pages.
Office Communication for U.S. Appl. No. 16/262,790 maned Aug. 23, 2019, 16 Pages.
Office Communication for U.S. Appl. No. 16/262,790 mailed Apr. 18, 2019, 14 Pages.
Office Communication for U.S. Appl. No. 16/262,756 mailed Oct. 25, 2019, 4 Pages.
Office Communication for U.S. Appl. No. 16/659,488 mailed Dec. 30, 2019, 6 Pages.
Office Communication for U.S. Appl. No. 14/595,598 mailed Dec. 31, 2019, 16 Pages.
Office Communication for U.S. Appl. No. 16/004,208 mailed Aug. 27, 2018, 11 Pages.
Office Communication for U.S. Appl. No. 16/234,395 mailed Aug. 8, 2019, 10 Pages.
Office Communication for U.S. Appl. No. 16/234,334 mailed Apr. 5, 2019, 15 Pages.
Office Communication for U.S. Appl. No. 16/234,395 mailed Mar. 28, 2019, 10 Pages.
Kappes, Giorgos et al., "Dike: Virtualization-awarn Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/473,051 mailed Jun. 30, 2017, 23 Pages.
Extended European Search Report for European Patent Application No. 18155779.4 mailed Apr. 17, 2018, 15 Pages.
Office Communication for U.S. Appl. No. 16/004,182 mailed Aug. 23, 2018, 43 Pages.
Office Communication for U.S. Appl. No. 16/004,182 mailed Mar. 5, 2019, 46 Pages.
Office Communication for U.S. Appl. No. 16/004,182 mailed Jul. 3, 2019, 45 Pages.
Office Communication for U.S. Appl. No. 15/694,604 mailed Jun. 3, 2019, 8 Pages.
Office Communication for U.S. Appl. No. 16/004,182 mailed May 22, 2019, 4 Pages.
Office Communication for U.S. Appl. No. 14/595,043 mailed May 4, 2017, 30 Pages.
Office Communication for U.S. Appl. No. 14/595,043 mailed Feb. 23, 2018, 16 Pages.
Office Communication for U.S. Appl. No. 14/595,043 mailed May 25, 2018, 7 Pages.
Office Communication for U.S. Appl. No. 14/595,043 mailed Oct. 5, 2018, 17 Pages.
Office Communication for U.S. Appl. No. 14/595,043 mailed Jun. 7, 2019, 19 Pages.
Office Communication for U.S. Appl. No. 14/595,043 mailed Aug. 27, 2019, 17 Pages.
Office Communication for U.S. Appl. No. 14/658,015 mailed Apr. 27, 2017, 7 Pages.
Office Communication for U.S. Appl. No. 14/658,015 mailed Jan. 4, 2018, 28 Pages.
Office Communication for U.S. Appl. No. 14/658,015 mailed Jul. 13, 2018, 8 Pages.
Office Communication for U.S. Appl. No. 14/859,061 mailed Sep. 22, 2017, 16 Pages.
Office Communication for U.S. Appl. No. 15/831,236 mailed Mar. 30, 2018, 8 Pages.
Office Communication for U.S. Appl. No. 15/831,236 mailed Aug. 15, 2018, 14 Pages.
Office Communication for U.S. Appl. No. 14/859,114 mailed Jul. 24, 2017, 41 Pages.
Office Communication for U.S. Appl. No. 14/859,114 mailed Feb. 21, 2018, 25 Pages.
Office Communication for U.S. Appl. No. 14/859,114 mailed May 11, 2018, 5 Pages.
Office Communication for U.S. Appl. No. 14/859,114 mailed Jun. 27, 2018, 33 pages.
Office Communication for U.S. Appl. No. 14/859,114 mailed Nov. 19, 2018, 35 Pages.
Office Communication for U.S. Appl. No. 14/859,114 mailed Jan. 31, 2019, 4 Pages.
Office Communication for U.S. Appl. No. 14/859,114 mailed Mar. 7, 2019, 32 Pages.
Office Communication for U.S. Appl. No. 14/859,114 mailed Jun. 26, 2019, 21 Pages.
Office Communication for U.S. Appl. No. 14/859,114 mailed Sep. 13, 2019, 6 Pages.
Office Communication for U.S. Appl. No. 14/859,114 mailed Nov. 26, 2019, 21 Pages.
Office Communication for U.S. Appl. No. 15/288,853 mailed Sep. 19, 2018, 13 pages.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 mailed Mar. 25, 2019, 25 Pages.
Cudre-Mauroux, Philippe et al., "TrajStore An Adaptive Storage System for Very Lar ie Trajecto1y Sets", ICDE 2010, Long Beach, CA, Mar. 1-6, 2010, pp. 109-120.
Office Communication for U.S. Appl. No. 16/436,825 mailed Jul. 11, 2019, 9 Pages.
Office Communication for U.S. Appl. No. 15/474,047 mailed Sep. 18, 2017, 14 Pages.
Office Communication for U.S. Appl. No. 15/474,047 mailed Mar. 9, 2018, 8 Pages.
Office Communication for U.S. Appl. No. 15/474,047 mailed Jun. 11, 2018, 6 Pages.
Office Communication for U.S. Appl. No. 15/474,047 mailed Aug. 15, 2018, 11 Pages.
Office Communication for U.S. Appl. No. 15/957,809 mailed Jun. 28, 2018, 27 Pages.
Office Communication for U.S. Appl. No. 15/957,809 mailed Jan. 24, 2019, 11 Pages.
Office Communication for U.S. Appl. No. 16/434,157 mailed Jul. 25, 2019, 8 Pages.
Office Communication for U.S. Appl. No. 15/854,447 mailed May 6, 2019, 9 pages.
Office Communication for U.S. Appl. No. 16/505,562 mailed Aug. 30, 2019, 11 Pages.
Extended European Search Report for European Patent Application No. 17206518.7 mailed Apr. 5, 2018, 8 Pages.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 mailed Jan. 7, 2020, 46 Pages.
Office Communication for U.S. Appl. No. 16/125,573 mailed Nov. 21, 2019, 13 Pages.
Office Communication for U.S. Appl. No. 16/226,587 mailed Oct. 24, 2019, 4 Pages.
Office Communication for U.S. Appl. No. 16/262,790 mailed Dec. 12, 2019, 10 Pages.

(56) References Cited

OTHER PUBLICATIONS

Office Communication for U.S. Appl. No. 16/234,334 mailed Jan. 16, 2020, 8 Pages.
Office Communication for U.S. Appl. No. 15/694,604 mailed Nov. 20, 2019, 8 Pages.
Office Communication for U.S. Appl. No. 16/262,756 mailed Jan. 28, 2020, 21 Pages.
Office Communication for U.S. Appl. No. 16/434,157 mailed Jan. 29, 2020, 9 Pages.
Office Communication for U.S. Appl. No. 16/262,790 mailed Feb. 6, 2020, 8 Pages.
Office Communication for U.S. Appl. No. 14/859,114 mailed Mar. 13, 2020, 21 Pages.
Office Communication for U.S. Appl. No. 16/752,451 mailed Mar. 12, 2020, 14 Pages.
Office Communication for U.S. Appl. No. 16/775,041 mailed Mar. 11, 2020, 8 pages.
Office Communication for U.S. Appl. No. 16/779,362 mailed Mar. 26, 2020, 10 Pages.
Wikipedia clustered file system page from elate Jul. 9, 2019, retrieved using the WayBackMachine, From https//web.archive.org/web/20190709083400/tlttps://en.wikipedia.org/wiki/Clustered_file_system (Year: 2019), pp. 1-6.
Wikipedia raft page from date Jul. 16, 2019, retrieved using the WayBackMachine, from tlttps://web.archive.org/web/20190716115001/https://en.wikipedia.org/wiki/Raft (computer_science) (Year: 2019), pp. 1-4.
Office Communication for U.S. Appl. No. 16/004,182 mailed Mar. 23, 2020, 4 Pages.
Office Communication for U.S. Appl. No. 16/752,509 mailed Apr. 2, 2020, 8 Pages.
Office Communication for U.S. Appl. No. 16/152,277 mailed Apr. 3, 2020, 10 Pages.
Office Communication for U.S. Appl. No. 16/004,182 mailed Apr. 28, 2020, 51 Pages.
Office Communication for U.S. Appl. No. 16/152,259 mailed Apr. 29, 2020, 19 Pages.
Office Communication for U.S. Appl. No. 14/859,114 mailed Jun. 5, 2020, 5 Pages.
Office Communication for U.S. Appl. No. 16/262,756 mailed Jun. 8, 2020, 22 Pages.
Office Communication for U.S. Appl. No. 14/595,598 mailed Jul. 9, 2020, 19 Pages.
Office Communication for U.S. Appl. No. 16/752,451 mailed Jul. 23, 2020, 8 Pages.
Office Communication for U.S. Appl. No. 14/859,114 mailed Jul. 23, 2020, 21 Pages.
Office Communication for U.S. Appl. No. 16/152,615 mailed Aug. 6, 2020, 7 Pages.
Office Communication for U.S. Appl. No. 16/779,362 mailed Aug. 7, 2020, 11 Pages.
Office Communication for U.S. Appl. No. 17/864,190 mailed Dec. 6, 2024, 8 Pages.
Office Communication for U.S. Appl. No. 17/062,500 mailed Jun. 13, 2023, 8 Pages.
Office Communication for U.S. Appl. No. 18/070,705 mailed Jun. 20, 2023, 16 Pages.
Office Communication for U.S. Appl. No. 18/070,705 mailed Feb. 23, 2023, 14 Pages.
Office Communication for U.S. Appl. No. 17/062,500 mailed Feb. 27, 2023, 23 Pages.
Office Communication for U.S. Appl. No. 17/954,640 mailed Mar. 15, 2023, 9 Pages.
Office Communication for U.S. Appl. No. 17/864,190 mailed Apr. 28, 2023, 5 Pages.
Office Communication for U.S. Appl. No. 17/973,944 mailed May 10, 2023, 9 Pages.
Office Communication for U.S. Appl. No. 17/115,529 mailed May 22, 2023, 25 Pages.
Office Communication for U.S. Appl. No. 17/864,190 mailed Jan. 24, 2023, 12 Pages.
Office Communication for U.S. Appl. No. 17/588,120 mailed Feb. 1, 2023, 15 Pages.
Office Communication for U.S. Appl. No. 17/864,190 mailed Sep. 19, 2022, 10 Pages.
Office Communication for U.S. Appl. No. 17/062,500 mailed Oct. 5, 2022, 4 Pages.
Office Communication for U.S. Appl. No. 17/203,452 mailed Oct. 19, 2022, 9 Pages.
Office Communication for U.S. Appl. No. 17/588,120 mailed Oct. 21, 2022, 5 Pages.
Office Communication for U.S. Appl. No. 17/203,452 mailed Nov. 9, 2022, 2 Pages.
Office Communication for U.S. Appl. No. 17/588,895 mailed Nov. 9, 2022, 11 Pages.
Office Communication for U.S. Appl. No. 17/954,640 mailed Nov. 30, 2022, 10 Pages.
Office Communication for U.S. Appl. No. 17/115,529 mailed Dec. 9, 2022, 21 Pages.
Office Communication for U.S. Appl. No. 17/484,167 mailed May 17, 2022, 3 Pages.
Office Communication for U.S. Appl. No. 17/484,167 mailed Jun. 10, 2022, 5 Pages.
Office Communication for U.S. Appl. No. 17/203,452 mailed Jun. 22, 2022, 22 Pages.
Office Communication for U.S. Appl. No. 14/595,598 mailed Jul. 13, 2022, 9 Pages.
Office Communication for U.S. Appl. No. 17/062,500 mailed Jul. 26, 2022, 20 Pages.
Office Communication for U.S. Appl. No. 17/588,120 mailed Jul. 27, 2022, 34 Pages.
Office Communication for U.S. Appl. No. 17/190,653 mailed Aug. 2, 2022, 8 Pages.
Office Communication for U.S. Appl. No. 17/115,529 mailed Aug. 8, 2022, 21 Pages.
Office Communication for U.S. Appl. No. 17/588,895 mailed Aug. 12, 2022, 12 Pages.
Office Communication for U.S. Appl. No. 17/203,452 mailed Sep. 8, 2022, 4 Pages.
Office Communication for U.S. Appl. No. 17/504,289 mailed Mar. 28, 2022, 9 Pages.
Office Communication for U.S. Appl. No. 17/588,120 mailed Apr. 11, 2022, 36 Pages.
Office Communication for U.S. Appl. No. 17/588,895 mailed Apr. 27, 2022, 6 Pages.
Office Communication for U.S. Appl. No. 17/190,653 mailed Apr. 28, 2022, 13 Pages.
Office Communication for U.S. Appl. No. 17/510,043 mailed Apr. 29, 2022, 10 Pages.
Office Communication for U.S. Appl. No. 17/115,529 mailed Apr. 29, 2022, 4 Pages.
Office Communication for U.S. Appl. No. 17/190,653 mailed Dec. 21, 2021, 12 Pages.
Office Communication for U.S. Appl. No. 14/595,598 mailed Dec. 29, 2021, 19 Pages.
Office Communication for U.S. Appl. No. 17/062,500 mailed Jan. 7, 2022, 4 Pages.
Office Communication for U.S. Appl. No. 16/741,567 malied Jan. 11, 2022, 6 Pages.
Office Communication for U.S. Appl. No. 17/203,452 mailed Jan. 14, 2022, 4 Pages.
Office Communication for U.S. Appl. No. 17/510,043 mailed Jan. 21, 2022, 13 Pages.
Office Communication for U.S. Appl. No. 16/741,567 mailed Feb. 7, 2022, 8 Pages.
Office Communication for U.S. Appl. No. 17/530,420 mailed Feb. 10, 2022, 24 Pages.
Office Communication for U.S. Appl. No. 16/004,182 mailed Feb. 18, 2022, 11 Pages.
Office Communication for U.S. Appl. No. 17/115,529 mailed Feb. 18, 2022, 20 Pages.

(56) References Cited

OTHER PUBLICATIONS

Office Communication for U.S. Appl. No. 17/203,452 mailed Feb. 24, 2022, 14 Pages.
Office Communication for U.S. Appl. No. 17/484,167 mailed Mar. 11, 2022, 11 Pages.
Office Communication for U.S. Appl. No. 17/062,500 mailed Mar. 22, 2022, 19 Pages.
Office Communication for U.S. Appl. No. 16/152,277 mailed Oct. 18, 2021, 5 Pages.
International Search Report and Written Opinion for International Patent Application No. PCT/US2021/023525 mailed Oct. 12, 2021, 6 Pages.
Office Communication for U.S. Appl. No. 17/115,529 mailed Oct. 22, 2021, 20 Pages.
Office Communication for U.S. Appl. No. 18/503,082 mailed Jan. 28, 2025, 8 Pages.
Office Communication for U.S. Appl. No. 18/945,379 mailed Feb. 21, 2025, 18 Pages.
International Search Report and Written Opinion for International Patent Application No. PCT/US2024/053881 mailed Jan. 21, 2025, 14 Pages.
International Search Report and Written Opinion for International Patent Application No. PCT/US2024/054442 mailed Feb. 10, 2025, 8 Pages.
Ryousei Takano, File System Ext2/Ext3, Software Design, No. 161, Mar. 18, 2004, 16 pages with English translation.
Naohiro Aota, "F2FS optimized for flash memory", Nikkei Linux, vol. 17 No. 3, Mar. 3, 2015, 7 pages with English translation.

\* cited by examiner

INTEGRATING FILE SYSTEM OPERATIONS WITH NETWORK INFRASTRUCTURE

TECHNICAL FIELD

The present invention relates generally to file systems, and more particularly, but not exclusively, to integrating file system operations with network infrastructure.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly available file systems may be expected to perform various actions to operate, recover from errors, perform backups, rebalancing data, or the like, that may consume significant system bandwidth.

Accordingly, in some embodiments, while sometimes overlooked, performance of distributed file systems may depend on the performance, reliability, or configuration of the underlying networking environment that may be hosting the file system. However, coordinating file system operations with network considerations may be difficult for some organization for various reasons. For example, the administration or operation of file systems may require different personal or skill sets than required for managing or maintaining network infrastructure. Also, in some cases, file systems may generally be designed to operate independently from networking infrastructure. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
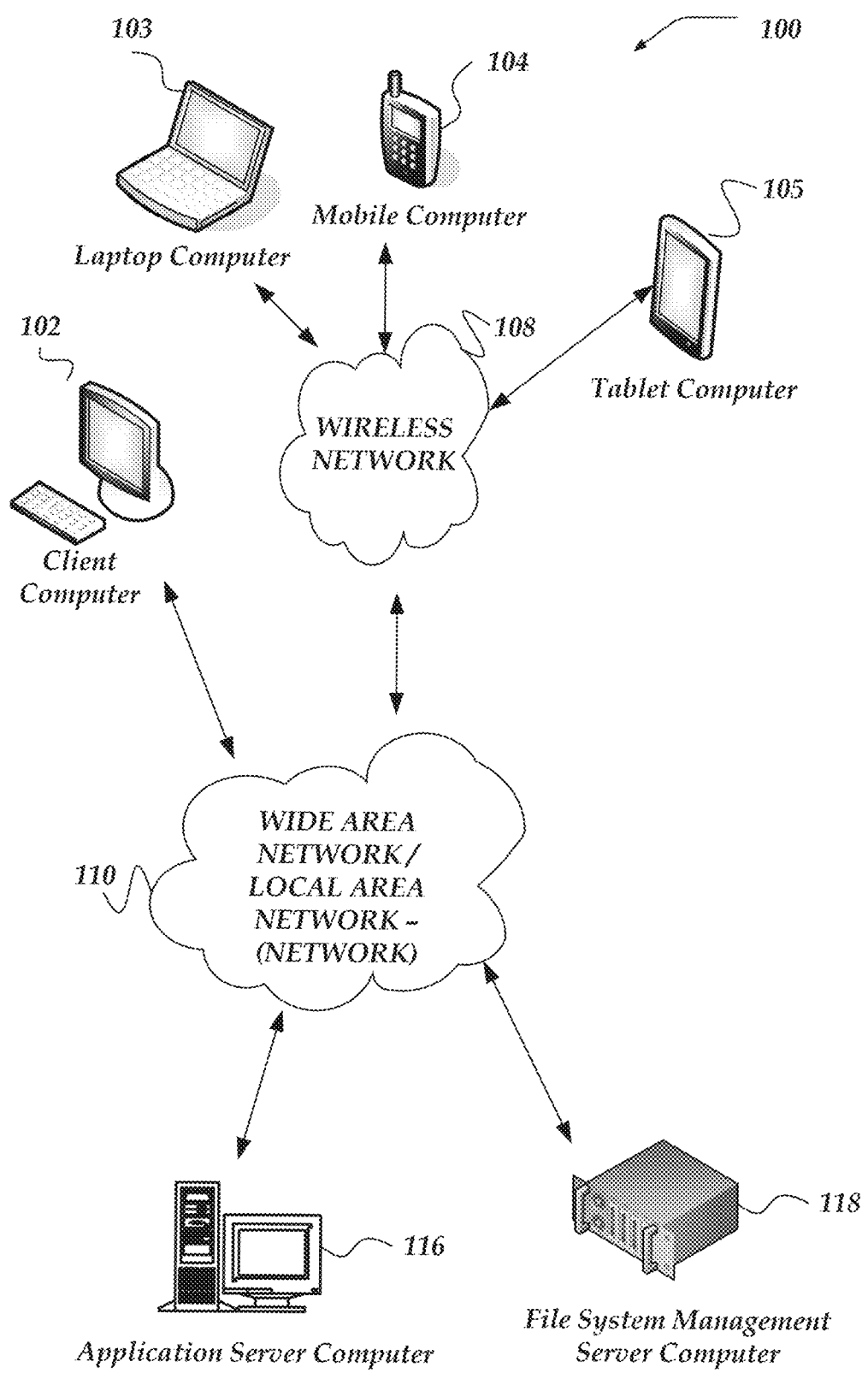
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PUP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "data block," or "file system block," refer to the portions of data used to store data in a file system. For example, small sized items such as directories or small files may be comprised of a single block. Whereas larger files, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), cloud-based block storage, or the like. However, files or other items stored in file systems may be of various sizes, comprised of the number of blocks necessary to represent or contain the data or meta-data for the item.

As used herein, the terms "network infrastructure component handler," or "component handler" refer to data structures that encapsulate instructions, scripts, rules, libraries, objects, or the like, to enable file systems to interact with particular network infrastructure components, such as network interfaces, switches, hubs, bridges, routers, firewall, or the like, that may be included the network infrastructure where the file system may be operating. Component handlers may be customized to employ APIs, protocols, messaging formats, or the like, that enable communication with particular network infrastructure components. For example, network infrastructure components from different manufacturers may have different features or interfaces such that specialized component handlers may be used for different network infrastructure components. In some cases, component handlers may be configured to support one or more standard protocols, such as Link Layer Discovery Protocol (LLDP) to interact with network infrastructure components.

As used herein, the term "file system operation" refers to various actions performed in a file system. These include actions performed by (or on behalf of) clients of file systems, such as reads, writes, moves, deletes, renaming, updates, listings (e.g., directory listings), or the like. Generally, actions performed on behalf of file system clients may be referred to as client requests or requests. Also, file system operations may include actions performed as part of the administration, operation, or maintenance of file systems, such as file system backup operations, data mirroring, data replication, data rebalancing, data pre-fetching, proactive data updates, notifications/messaging, data protection operations, snapshot operations, data recovery operations, file system control plane communications, meta-data sharing, or the like.

As used herein, the terms "file system operation handlers," or "operation handlers" refer to data structures that encapsulate instructions, scripts, rules, libraries, objects, or the like, that may be used to integrate various file system operations with network infrastructure. Operations handlers may be configured to associate one or more file system operations with particular network infrastructure configurations or network infrastructure integration actions. Operation handlers may selectively employ one or more component handlers to interact with network infrastructure components. Note, in some cases, component handlers or operation handlers may be included in the same data structures, processes, libraries, or the like, rather than being separate.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system over a network. In one or more of the various embodiments, a plurality of file system operations may be executed in the file system based on one or more of a file system client action or a file system administrative action such that the file system may be integrated with an infrastructure of the network that includes a plurality of network devices.

In one or more of the various embodiments, one or more messages associated with one or more of the plurality of network devices may be employed to perform one or more actions, including: determining one or more file system operations of the plurality of file system operations that may be associated with the one or more network devices based on the one or more messages; modifying the infrastructure associated with the one or more network devices in response to the one or more messages or the one or more file system operations; modifying the one or more file system operations in response to the modified infrastructure; executing the one or more modified file system operations; or the like.

In one or more of the various embodiments, modifying the infrastructure may include: determining one or more network interfaces associated with the one or more network devices based on the one or more messages such that the one or more network interfaces communicate network traffic associated with the one or more file system operations and such that the one or more messages indicate an impending shutdown of the one or more network interfaces; determining one or more other network interfaces based on the one or more the network devices and the one or more file system operations; communicating the network traffic associated with the one or more file system operations using the one or more other network interfaces; or the like.

In one or more of the various embodiments, modifying the infrastructure may include: determining network traffic directed to one or more target destinations such that the network traffic may be associated with the one or more file system operations; determining one or more paths to the one or more target destinations in the infrastructure based on the one or more network devices; assigning one or more portions of the network traffic to the one or more paths based on one or more metrics such that the one or more metrics may include one or more of a hop count metric, a latency metric, a utilization metric, an error rate metric, or a packet size metric; communicating the one or more portions of the network traffic to the one or more target destinations over the assigned paths in the infrastructure; or the like.

In one or more of the various embodiments, modifying the infrastructure may include: determining network traffic directed to one or more target destinations such that the network traffic may be associated with the one or more file system operations; determining two or more equal cost paths to the one or more target destinations in the infrastructure based on the one or more network devices; communicating the one or more portions of the network traffic to the one or more target destinations over the two or more equal cost paths such that the one or more portions of the network traffic may be randomly distributed across the two or more equal cost paths; or the like.

In one or more of the various embodiments, modifying the one or more file system operations may include: determining network traffic directed to one or more target destinations such that the network traffic may be associated with the one or more file system operations; associating one or more priority values with one or more portions of the network traffic based on the one or more file system operations such that the one or more network devices prioritize the one or more portions of the network traffic based on the one or more priority values; or the like.

In one or more of the various embodiments, executing the plurality of file system operations may include executing one or more of a file system client request, a file system backup operation, a file system recovery operation, a metadata update operation, a snapshot operation, a data protection operation, a data pre-fetch operation, a data mirroring operation, a data replication operation, a rebalancing operation, a proactive data update operation, a notification or message operation, or the like.

In one or more of the various embodiments, one or more queries may be generated based on one or more impending file system operations such that the one or more queries may be communicated to a portion of the plurality of network devices/In some embodiments, one or more portions of the infrastructure may be modified based on one or more responses associated with the one or more queries. Also, in some embodiments, the one or more impending file system operations may be executed in the one or more modified portions of the infrastructure.

In one or more of the various embodiments, the plurality of network devices may include one or more of a network interface, a network switch, a hub, a network bridge, a router, an access point, a load balancer, a modem, a gateway, a firewall, or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include the capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
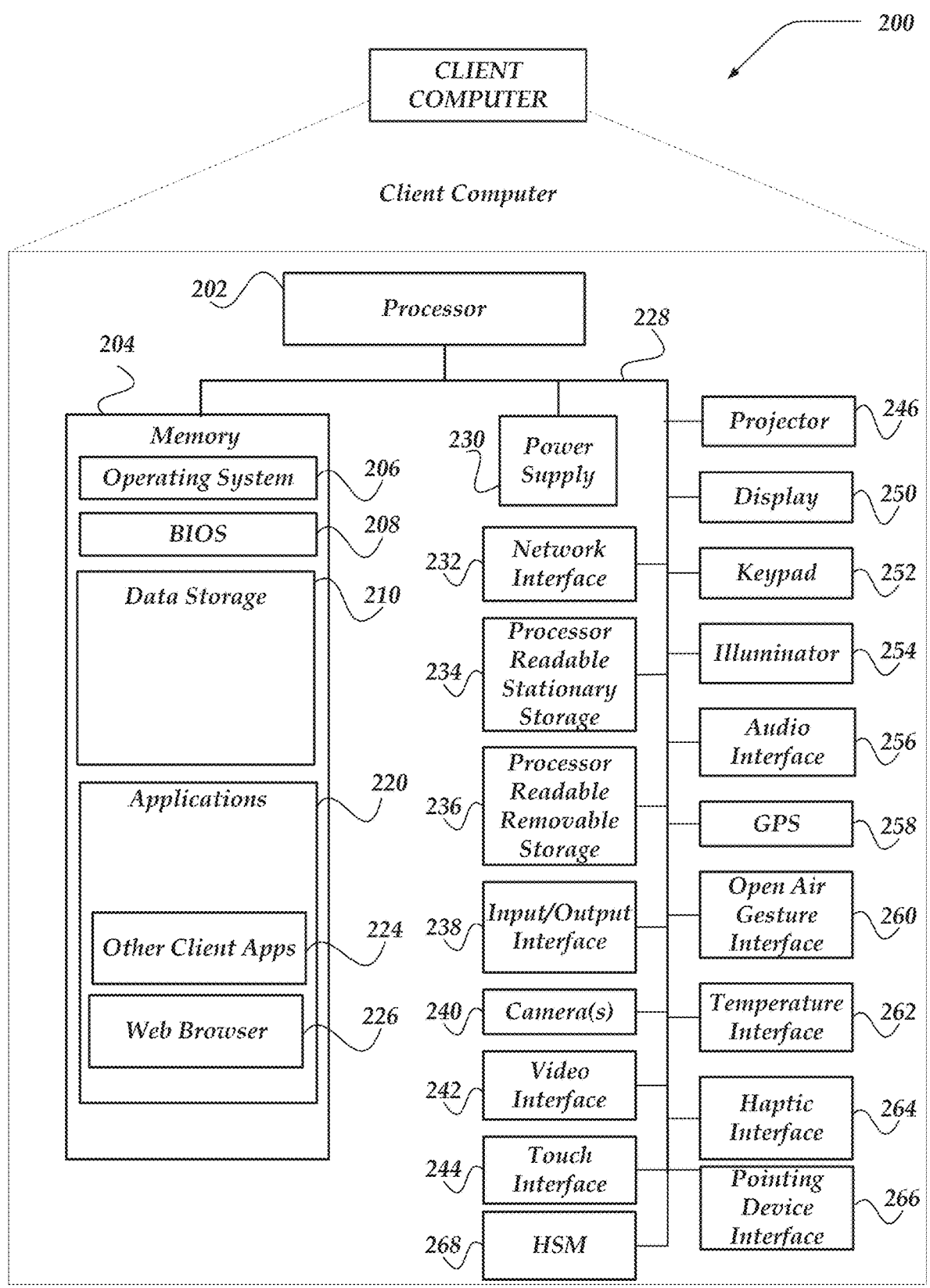
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer.

And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing, or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
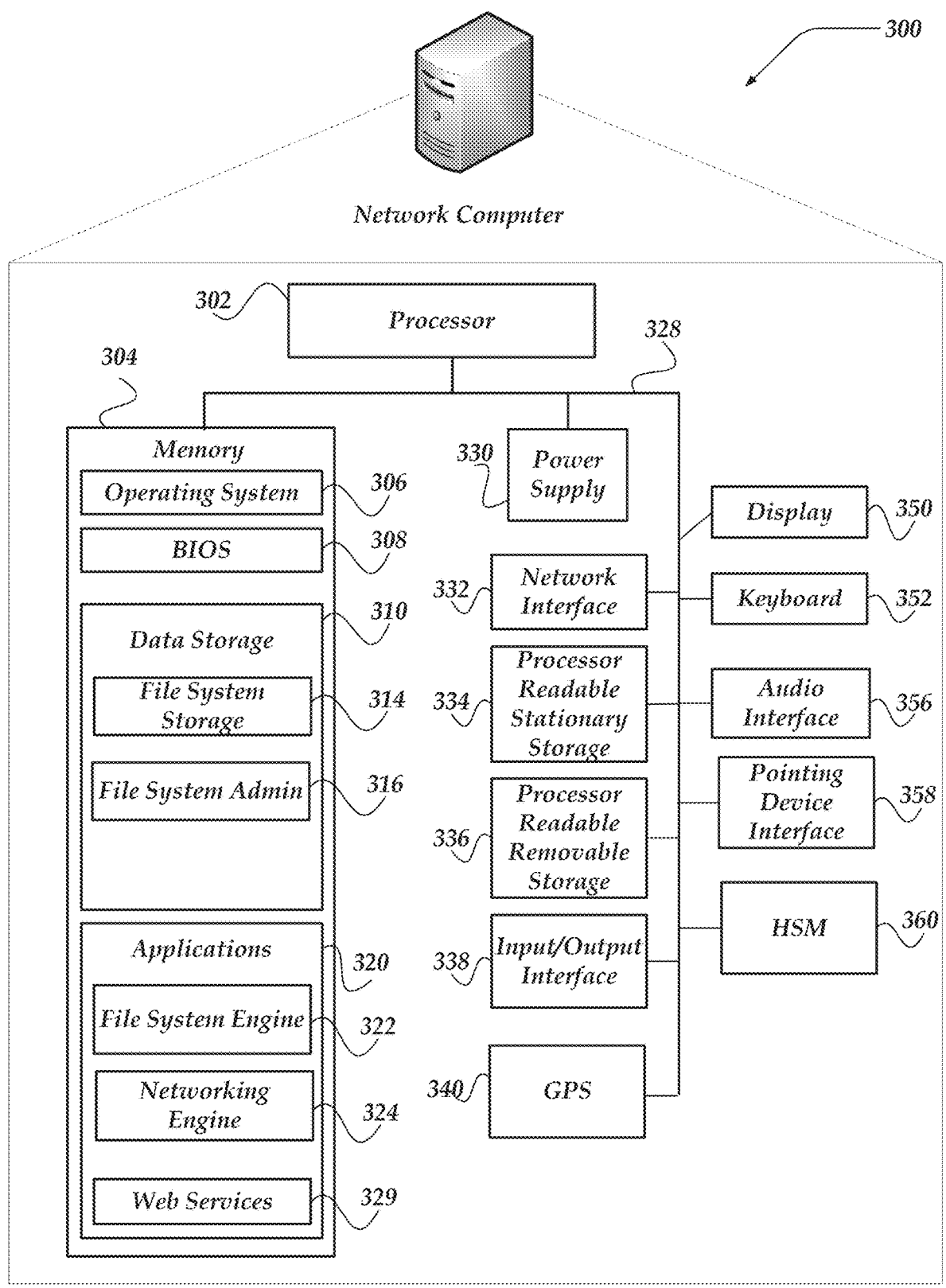
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, networking engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system administrative data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, networking engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, networking engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, networking engine 324, web services 329, or the like, may be provisioned and de-commissioned automatically.

Also, in one or more of the various embodiments, file system engine 322, networking engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing, or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
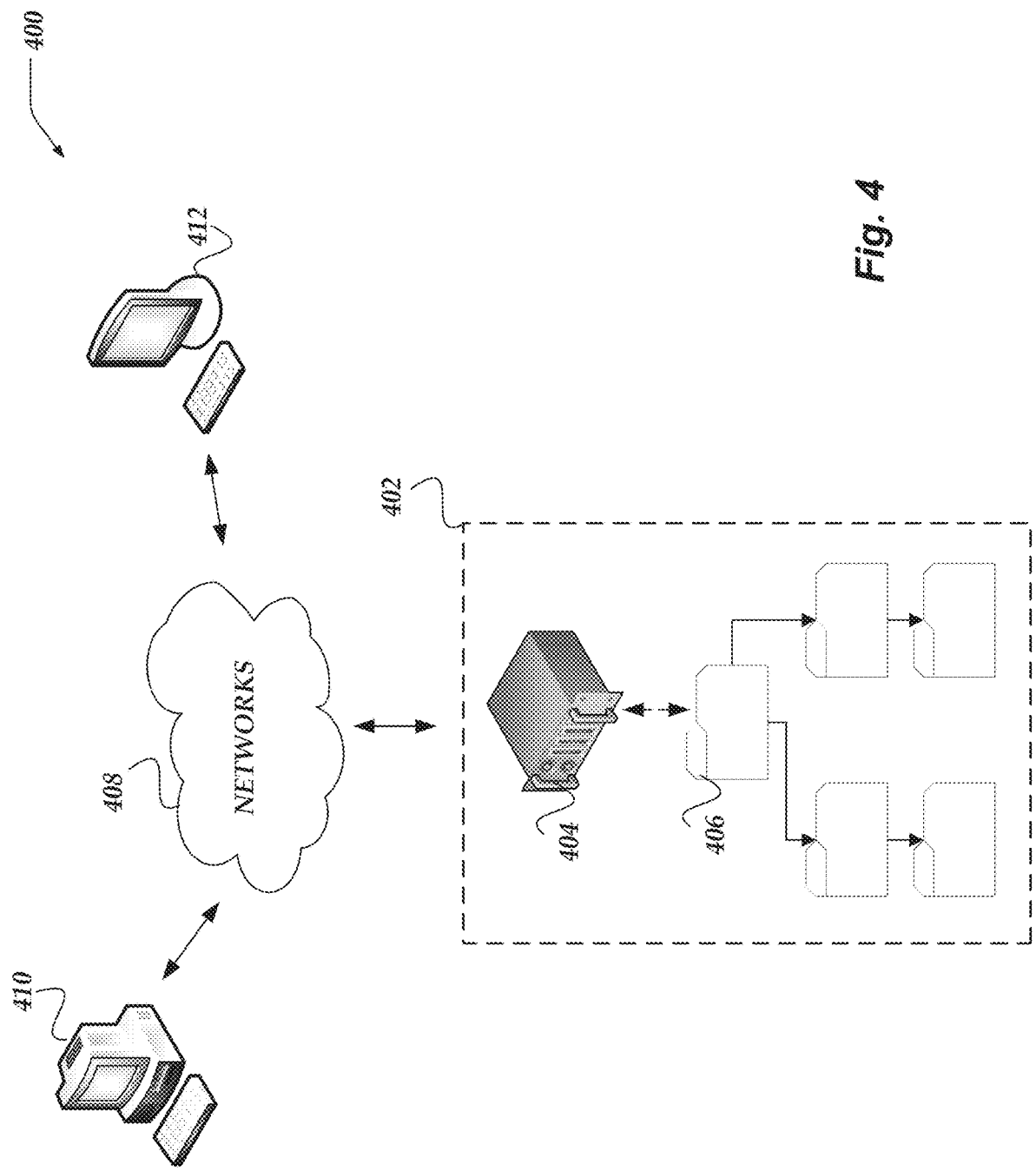
FIG. 4 illustrates a logical architecture of a system for integrating file system operations with network infrastructure in accordance with one or more of the various embodiments.

FIG. 4 illustrates a logical architecture of system 400 for integrating file system operations with network infrastructure in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., files, directories, documents, file system meta-data, or the like) that may be stored in file system 402.

In some embodiments, file system 402 may comprise one or more file system management computers, such as file system management computer 404. Also, in one or more of the various embodiments, file systems, such as file system 402 may include one or more file system items, such as item 406. In one or more of the various embodiments, item 406 may be considered to represent the various file system items, such as, documents, files, or the like, that may be stored in file system 402. In some embodiments, file system items may include files, documents, directories, folders, backups, snapshots, replication snapshots, replication information, or the like. In some embodiments, some file system items may be comprised of smaller file system items. Accordingly, in some embodiments, blocks or data blocks may be considered to be the smallest file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports sharing namespaces across file system clusters because file system engines may be arranged to mimic the interface or behavior of one or more conventional file systems.

Also, while file system 402 is illustrated as using one file system management computer with one set of file system items, these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, storage clusters, or the like.

Figure 5:
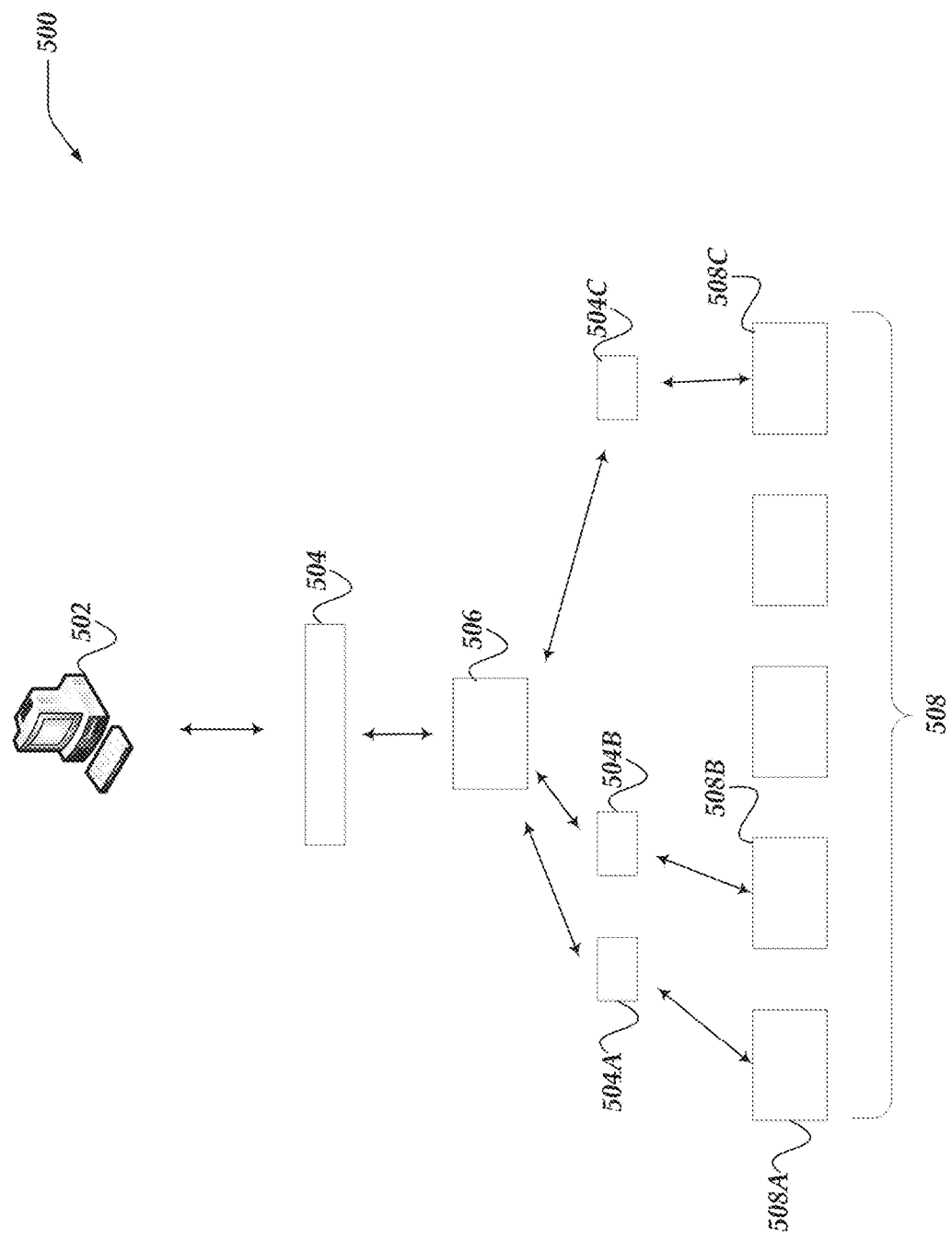
FIG. 5 illustrates a logical schematic of a file system 500 integrating file system operations with network infrastructure in accordance with one or more of the various embodiments.

FIG. 5 illustrates a logical schematic of file system 500 for integrating file system operations with network infrastructure in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according to one or more data protection schemes, striping schemes, RAID configurations, or the like, that may provide a desired level of data protection, performance, high-availability, or the like, that may vary depending on the given file system.

In some embodiments, file system clients may be enabled to issue various file system commands (e.g., read file, remove file, save file, or the like) to a file system engine that may initiate one or more command transactions. Accordingly, in some embodiments, file system engines may be arranged to determine which portion of the command transaction may be satisfied by various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction. Accordingly, in some embodiments, read transactions may be directed to reading file system items (e.g., files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request is completed successfully, the read transaction may be considered successful, and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction was completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

Figure 6:
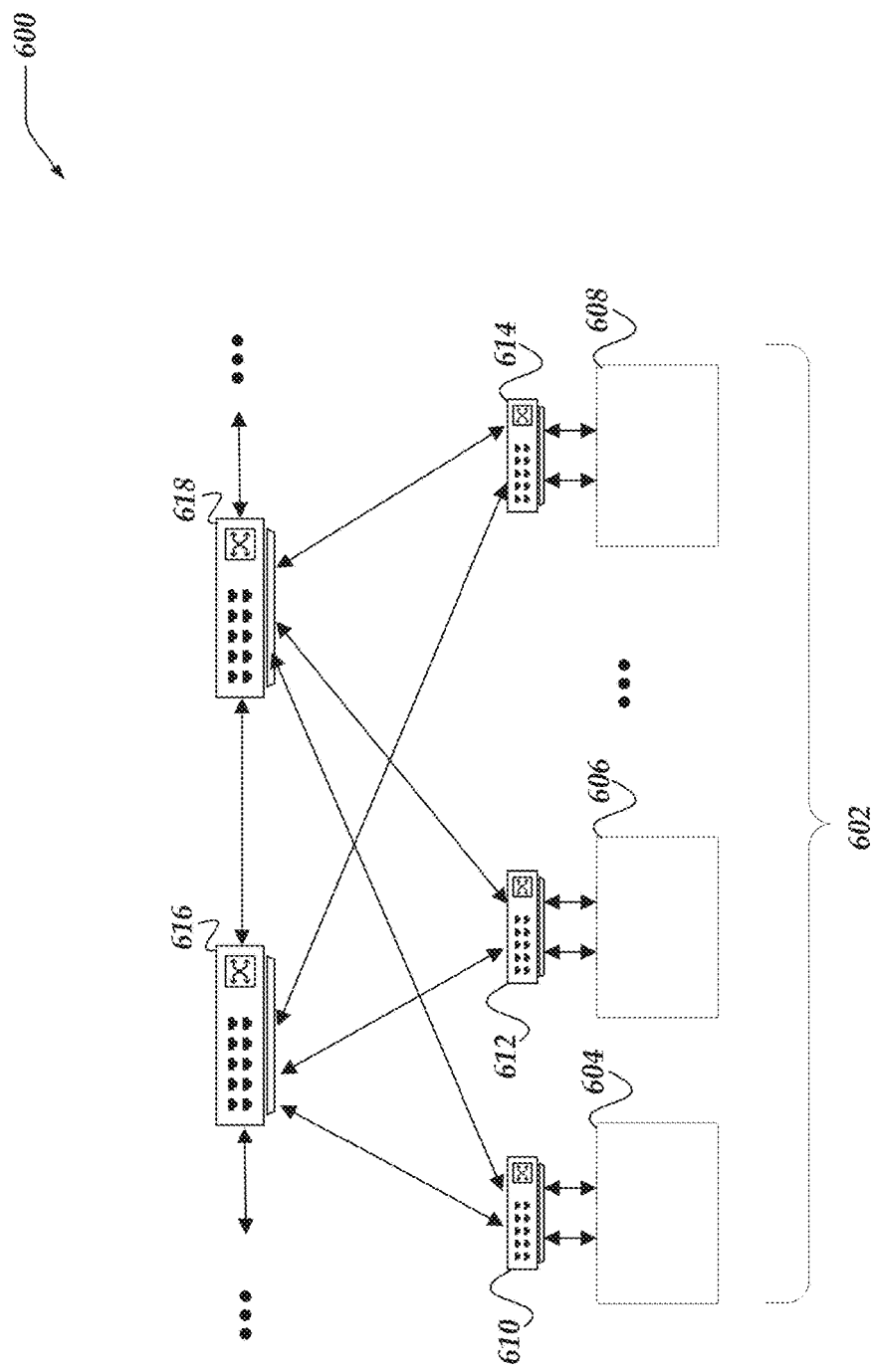
FIG. 6 illustrates a logical schematic of a file system for integrating file system operation with network infrastructures in accordance with one or more of the various embodiments.

FIG. 6 illustrates a logical schematic of file system 600 for integrating file system operation with network infrastructures in accordance with one or more of the various embodiments.

In some embodiments, as described above, file systems may be distributed across one or more nodes or clusters in a networked environment. Accordingly, in some embodiments, file system clusters, such as file system cluster 602 may include one or more file system nodes, such as file system node 604, file system node 606, file system node 608, or the like. In some embodiments, nodes or clusters in file systems may be directly associated with local network infrastructure that enable nodes or clusters to gain access to the networking environment that may be hosting the file system. In this example: switch 610 may enable file system node 604 to access a network; switch 612 may enable file system node 606 to access the network; switch 614 may enable file system node 608 to access the network; or the like.

Note, one of ordinary skill in the art will appreciate that in practice networking environments may include various network infrastructure components, such as hubs, switches, bridges, routers, firewalls, or the like, and in some cases a same device may perform two or more overlapping roles that may fall under different categories. Thus, for brevity and clarity switch 610, or the like, may be considered to represent various network devices rather than being strictly limited to network switches.

In some embodiments, file system performance may often be dependent on network performance or network configuration. Also, in some embodiments, network performance may be dependent on how file systems execute or perform various operations that may consume significant networking capacity. For example, if network infrastructure may be under provisioned or incorrectly configured, file systems may be less performant than desired or expected because of the inherent limitations in bandwidth, latency, path/route contention, or the like, that may impact file system performance. Similarly, in some embodiments, large or active file systems may consume an amount of network resources such that other critical services in the networking environment may be starved of network access or network throughput, or otherwise disadvantaged.

Accordingly, in some embodiments, it may be advantageous for file systems to proactively and dynamically integrate with the network infrastructure that may be hosting the file system. Accordingly, in some embodiments, file system engines may be arranged to integrate with network infrastructure to enable the file system to actively manage one or more characteristics of the network infrastructure. Thus, in some embodiments, file system engines may be arranged to dynamically modify file system behavior or network infrastructure configurations to adapt to different circumstances.

For example, in some embodiments, file system engines may be arranged to monitor performance characteristics of various networking infrastructure components such as network interfaces, ports, switches, routers, or the like, to determine how to advantageously conduct or "shape" file system operations. Also, for example, in some embodiments, file system engines may be arranged to communicate with network infrastructure components that support various network configuration communication protocols or device communication protocols. Accordingly, in some embodiments, file system engines may be arranged to monitor events, notifications, messages, status updates, or the like, generated by portions of network infrastructure, network infrastructure components, various network devices, or network appliances that may support such communications. Thus, in some embodiments, file system engines may be arranged to adapt file system operations in view of the communications from network infrastructure components.

Also, in some embodiments, file system engines may be arranged to send messages, notifications, events, or the like, to various portions of network infrastructure, various network devices, or network appliances that may support such communications. Accordingly, in some embodiments, file system engines may be arranged to adapt or configure network infrastructure in view of pending or impending file system operations or other file system performance considerations.

In this example, for some embodiments, file system 600 includes one or more spine switches, such as spine switch 616, spine switch 618, or the like. In some embodiments, spine switches may be considered to be devices in network environment that connect to one or more leaf switches, such as switch 610, switch 612, switch 614, or the like. In some embodiments, spine switches may be considered to be backbone network components that may be specialized for communicating (exchanging network traffic) with other spine switches or other backbone network components as well as handling network traffic to or from leaf switches. Note, one of ordinary skill in the art will appreciate that backbone network components may include devices or components other than switches. However, for brevity and clarity, in some cases relevant backbone components may be referred to as spine switches unless expressly stated.

In some embodiments, file system nodes (network computers) may include networking engines, such as networking engine 324 (in FIG. 3). In some embodiments, networking engines may be arranged to execute various actions associated communicating or integrating with network infrastructure. In some embodiments, networking engines may be included within file system engines rather than being separate processes or applications, Also, in some embodiments, some portions of networking engines may be embedded in networking infrastructure components rather than strictly being hosted on file system nodes. In some embodiments, the allocation of networking engine components may vary depending on the capabilities of the network infrastructure. For example, in some embodiments, if the switches in a file system may be considered "dumb" switches that have limited integration capability, networking engines on file system nodes may be configured to perform most or all of the networking related actions. In contrast, in some embodiments, if the switches in the file system may be smart switches that enable one or more onboard features, such as remote management, remote monitoring, configuration communication protocols, network address selection/pooling, interface pooling, interface aggregation, or the like, networking engines may be configured to employ APIs or communication protocols to leverage the onboard features of smart infrastructure devices to support or improve file system operations.

For example, in some embodiments, efficient traffic distribution across network uplinks used in distributed file systems may be crucial for optimizing network performance in support of file system operations. In some cases, conventional load balancing methods may not effectively handle traffic congestion or large traffic flows such as those related to some file system operations. Accordingly, innovations described herein employ load balancing that includes packet spraying, a technique to selectively mark and distribute datagrams across available uplinks, reducing contention and enhancing network performance which may enhance the performance of the file system as a whole.

In some embodiments, file system engines may be arranged to employ load balancing such as packet spraying. Accordingly, in some embodiments, file system engines may be arranged to selectively mark datagrams in network traffic associated with file system operations to facilitate effective load balancing across multiple uplinks from leaf switches to spine switches. Thus, in some embodiments, this method may ensure efficient traffic distribution from the file system nodes across spine switches, reducing contention or improving overall network performance which may result in improved file system performance.

Further, in some embodiments, while file system 600 may be described here using physical networks or physical hardware devices, one of ordinary skill in the art will appreciate that some or all portions of file systems, such as file system 600 may be hosted in cloud computing environments. In some embodiments, file system nodes may be virtual computers provisioned in the cloud environment. Also, in some embodiments, one or more network components or network devices may be provided in a cloud environment using virtualized devices, cloud based services, Software as a Service (SaaS) features provided by the cloud computing environment, virtualized network interfaces, virtualized switches, virtualized routers, virtualized firewalls, virtualized block storage, virtualized object storage, or the like. Thus, one of ordinary skill in the art will appreciate that the innovations disclosed herein are anticipated to operate in physical environments, cloud computing environments, or hybrid computing environments. Also, in some embodiments, some or all the networking infrastructure used by file systems may be provided as so-called software defined networks, physical network infrastructure, or combination thereof.

Figure 7:
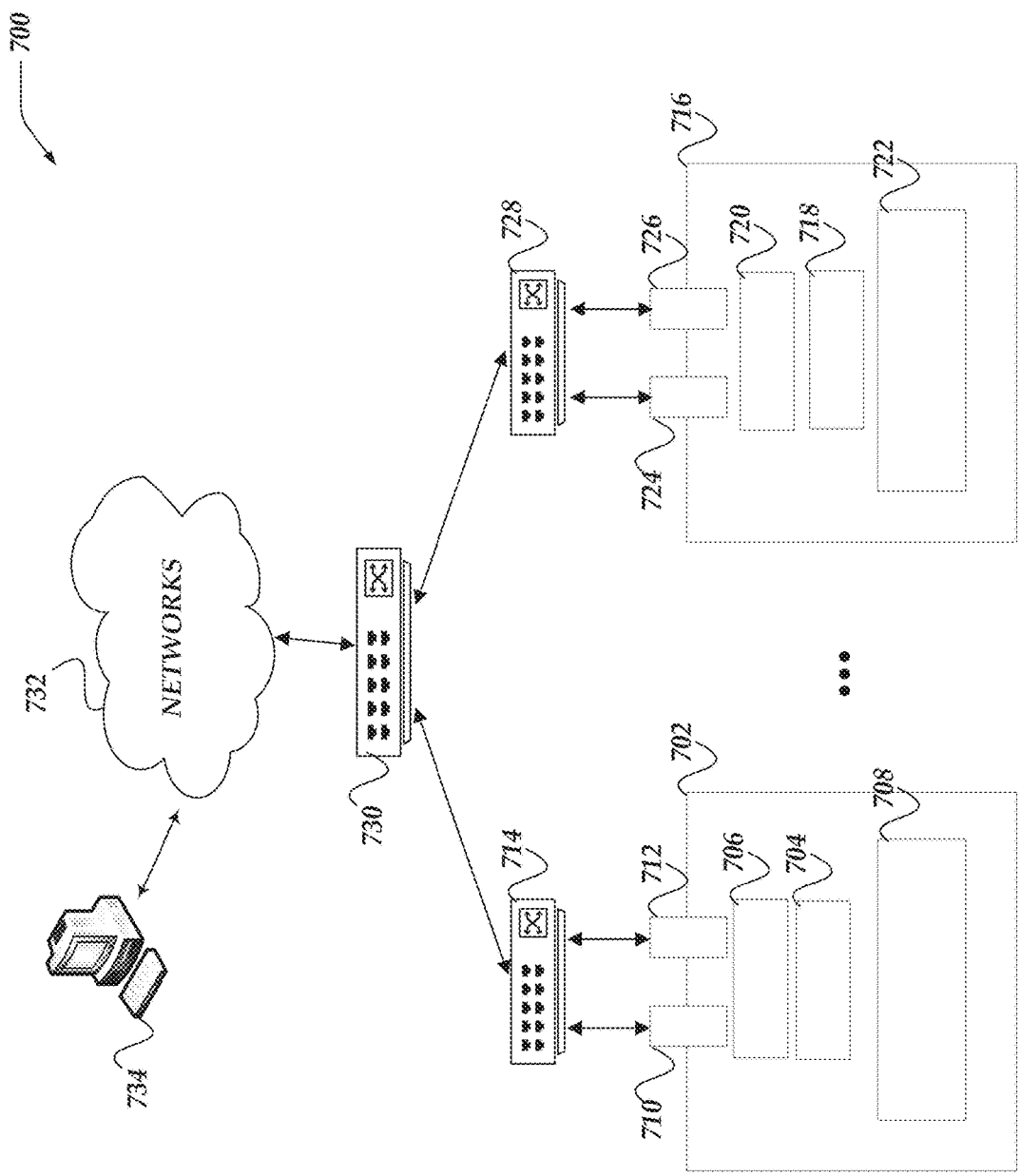
FIG. 7 illustrates a logical schematic for a file system for integrating file system operation with network infrastructure in accordance with one or more of the various embodiments.

FIG. 7 illustrates a logical schematic for file system 700 for integrating file system operation with network infrastructure in accordance with one or more of the various embodiments. As described above, in some embodiments, file system may be comprised of one or more file system nodes or one or more file system clusters. In the example, for some embodiments, file system node 702 may include file system engine 704, networking engine 706, file system storage 708, network interface 710, network interface 712, or the like. Likewise, in this example, for some embodiments, file system node 716 may include file system engine 718, networking engine 720, file system storage 722, network interface 724, network interface 726, or the like. Further, in some embodiments, file system nodes, such as file system node 702 or file system node 716 may be connected to one or more switches, such as switch 714 or switch 728. In some embodiments, switches, such as switch 714 or switch 728 may enable file system nodes to connect with other switches or spine switches, such as spine switch 730. Accordingly, in some embodiments, spine switches, such as spine switch 730 may be configured to provided network connectivity to one or more other networks, such as networks 732 to enable one or more file system clients, such as file system client 734 to access various file system services enabled by file system 700.

In some embodiments, file system engines may be configured to selectively interact with various network infrastructure components. For example, in some embodiments, file system engines (or networking engines) may be arranged to select from one or more network interfaces, such as network interface 710 or network 712 depending on the characteristics of the file system operation or the network interface. Likewise, for example, in some embodiments, file system engines or networking engines may be arranged to adapt to the specifications of network infrastructure components, such as switch 714 or switch 730. Also, in some embodiments, file system engines or networking engines may be arranged to selectively adapt one or more file system operations to the characteristics of the wider network (e.g., networks 732) or client behavior (e.g., client 734).

Figure 8:
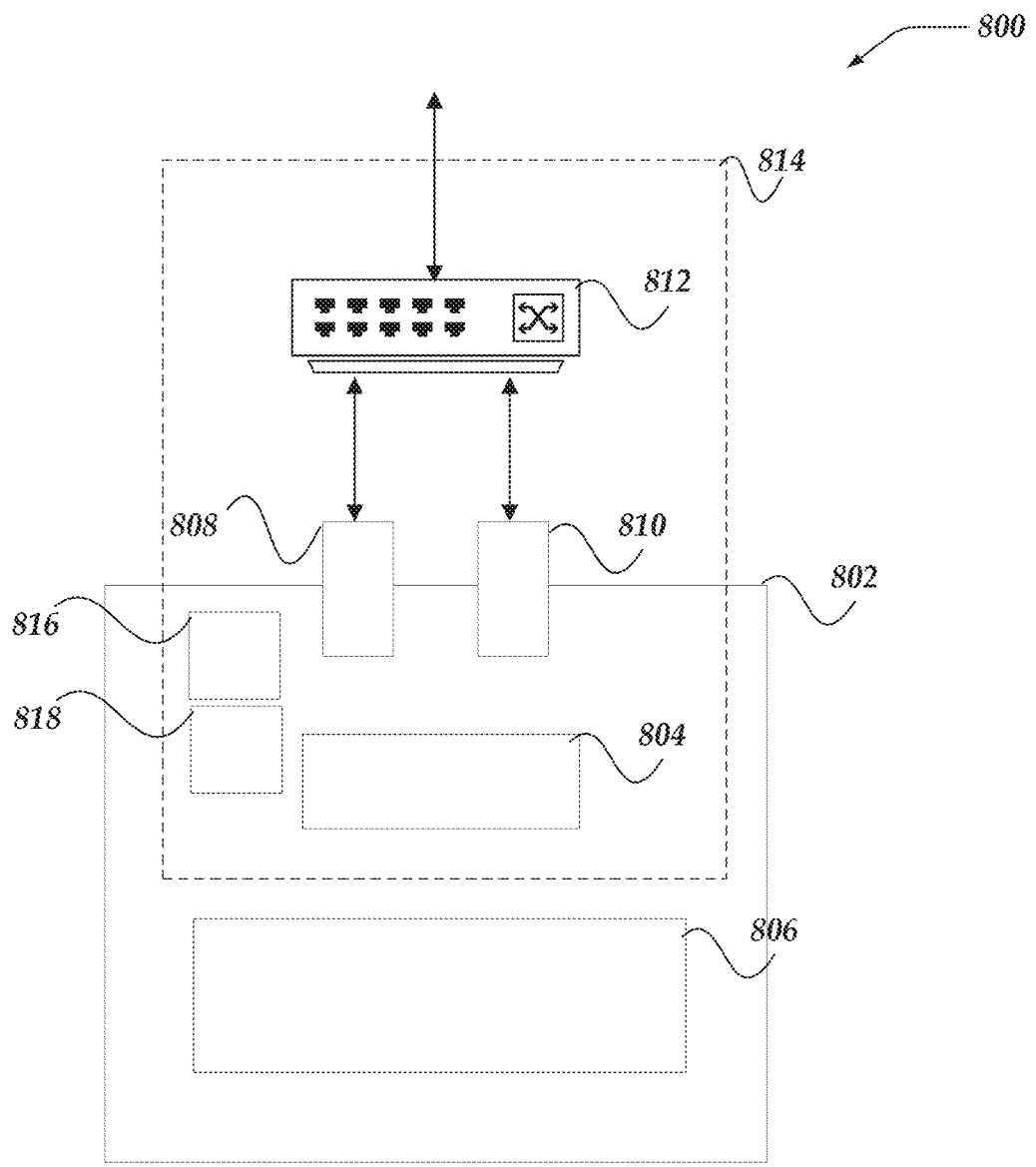
FIG. 8 illustrates a logical schematic for a file system node for integrating file system operation with network infrastructure in accordance with one or more of the various embodiments.

FIG. 8 illustrates a logical schematic for file system node 800 for integrating file system operation with network infrastructure in accordance with one or more of the various embodiments. As described above, file system nodes, such as file system node 802 may include: file system engines, such as file system engine 804; file system storage, such as file system storage 806; one or more network interfaces, such as network interface 808 or network interface 810; a switch, such as switch 812; a networking engine, such as networking engine 814. Also, in some embodiments, file system engines or networking engines may be arranged to include one or more network infrastructure component handlers, such as network infrastructure component handlers 816. Also, in some embodiments, file system engines or networking engines may be arranged to include one or more file system operations handlers, such as file system operation handlers 818.

In this example, for some embodiments, networking engine 814 is illustrated using a dashed bounding box to represent that its features or functions may be spread across different components of file system nodes. For example, in some embodiments, if switch 812 may be a smart switch that offers features, such as remote configuration, remote monitoring, automatic status reporting, messaging, remote interrogation of performance metrics, or the like, logically portions of networking engine 814 may be considered to be provided by switch 812, or the like. Also, in some embodiments, some network interfaces may offer various features or functions that enable networking engine operations. And, in some embodiments, file system engines, such as file system engine 804 may incorporate or embed some or all networking engine functionality. Accordingly, in some embodiments, the responsibilities attributed to networking engines may be shared across file system nodes or one or more network infrastructure components depending on the capabilities of the given network infrastructure component.

For example, in some embodiments, if switch 812, network interface 808, network interface 810, or the like, are considered dumb devices, or otherwise omit features or functionality to support integrating file system operations with network infrastructure, networking engine 814 may be considered to operating exclusively on file system node 802. In contrast, in some embodiments, if switch 812, or the like, may provide direct/onboard support for integrating file system operations with network infrastructure, portions of networking engine 814 may be considered to be provided or hosted on switch 812, or the like.

Accordingly, in some embodiments, networking engine 814 is illustrated using a dashed line bounding box that overlaps several components of file system node 802 to represent how the functions or features of networking engine 814 may be configured to be distributed among or across different components depending on the capabilities of those components. For example, in some embodiments, networking engines may be configured to monitor network traffic rate by querying a network interface or switch if those devices support such performance metric monitoring or reporting. Also, for example, in some embodiments, if the switch or network interfaces do not support such reporting or traffic accounting, networking engines may be arranged to employ operating system level services, customized software based performance monitors, or the like, to determine (or estimate) network traffic rate information.

In some embodiments, network infrastructure component handlers, such as network infrastructure component handlers 816 may be a collection of rules, instructions, parsers, APIs, or the like, that may be arranged to integrate with particular network infrastructure components. In some cases, for some embodiments, one or more network infrastructure component handlers may be configured for particular network infrastructure components. For example, in some embodiments, a component handler for a particular smart component may be arranged to communicate with the particular components using network protocols, APIs, or the like, that enable integration with the particular components. Thus, in some embodiments, component handlers may be assumed to include data structures or instructions for interpreting messages from components, sending messages to components, or the like. In some embodiments, component handlers may be configured to wrap libraries or APIs provided by network infrastructure component manufactures.

In some embodiments, some or all component handlers may be built into file system engines or networking engines. Also, in some cases, component handlers or one or more portions of component handlers may be provided or hosted by particular network infrastructure components such that some or all functionality or responsibility for integrating file system operations with network infrastructure may be integral to one or more network infrastructure component rather than being limited to executing on a file system node.

Accordingly, in some embodiments, as new or different network infrastructure components may be encountered, additional component handlers may be included as well. Thus, in some embodiments, file system engines or networking engines may be arranged to provide one or more network infrastructure component handlers via configuration information to account for local circumstances or local requirements.

Further, in some embodiments, file system engines or networking engines may be arranged to include one or more file system operation handlers, such as file system operation handlers 818. In some cases, for brevity, file system operation handlers may be referred herein as operation handlers. In some embodiments, operation handlers may be data structures that encapsulate libraries, objects, rules, instructions, or the like, that determine one or more particular file system operation to perform in response to messages, status changes, or the like, that may be provided by network infrastructure components. For example, in some embodiments, if an integrated network infrastructure component indicates that it may be going offline, a file system operation handler may be activated to perform or initiate one or more actions in response to the network infrastructure activity. In some cases, in some embodiments, operation handlers may include a map that associates one or more infrastructure events with one or more file system operations. Also, in some cases, for some embodiments, file system operation handlers may be complex libraries that may be tightly integrated with file system engines. In some embodiments, file system engines may be arranged to be highly adaptable to support various file system operations, including new operations that may come online at a later date with new versions of the file system. Also, in some embodiments, the level of network infrastructure integration supported by file system engines may vary depending on the version or configuration of the file system. For example, the level of integration may vary depending on the type of license a file system user may have. Thus, in some embodiments, file system engines may be arranged to determine file system operations handlers based on configuration information to account for local circumstances or local requirements.

Also, in some embodiments, the availability of some features associated with integrating file system operations with network infrastructure may depend in part on the capabilities of the network infrastructure. For example, if a switch does not support Quality of Service (QoS) policies with differentiated services code points, file system engines or networking engines may be disabled from performing some or all QoS related optimizations or dynamic configuration.

Generalized Operations

FIGS. 9-14 represent generalized operations for integrating file system operation with network infrastructure in accordance with one or more of the various embodiments. In one or more of the various embodiments, processes 900, 1000, 1100, 1200, 1300, or 1400 described in conjunction with FIGS. 9-14 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based environments. However, embodiments are not so limited and various combinations of network computers, client computers, or the like may be utilized. Further, in one or more of the various embodiments, the processes described in conjunction with FIGS. 9-14 may perform one or more actions for integrating file system operation with network infrastructure in accordance with at least one of the various embodiments or architectures such as those described in conjunction with FIGS. 1-8. Further, in one or more of the various embodiments, some or all of the actions performed by processes 900, 1000, 1100, 1200, 1300, or 1400 may be executed in part by one or more of file system engine 322, networking engine 324, or the like.

Figure 9:
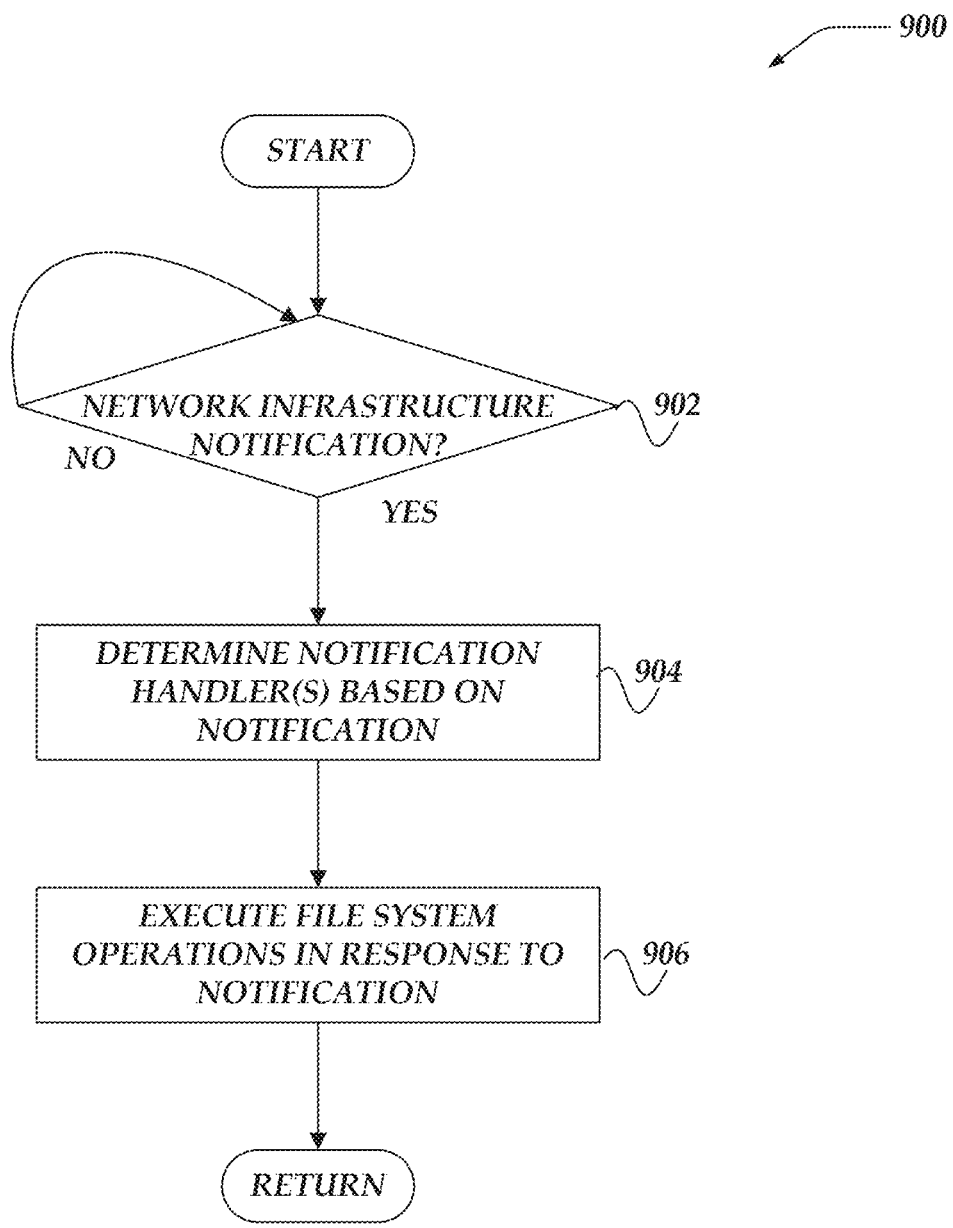
FIG. 9 illustrates an overview flowchart for a process for integrating file system operations with network infrastructure in accordance with one or more of the various embodiments.

FIG. 9 illustrates an overview flowchart for process 900 for integrating file system operations with network infrastructure in accordance with one or more of the various embodiments. After a start flowchart block 902, at flowchart decision block 902, in one or more of the various embodiments, if a file system engine may be provided one or more notifications associated with networking infrastructure, control may flow to flowchart block 904; otherwise, control may loop back to flowchart decision block 902. In some embodiments, file system engines may be arranged to integrate with different portions or components of the network infrastructure where the file system is hosted or operating within.

In some embodiments, file system engines (or networking engines) may be arranged to provide one or more APIs that enable network infrastructure to send notifications or alerts to the file system engines or networking engines. Note, for brevity and clarity, the term file system engine should be interpreted as including networking engines rather than strictly referring to file system engines or networking engines separately.

In some embodiments, file system engines may be configured to periodically query one or more metrics or status indicators for various portions of the network infrastructure. In some embodiments, file system engines may be configured to register with one or more network infrastructure components, such as switches, network interfaces, routers, hubs, bridges, firewalls, or the like, to receive notifications or status updates.

Further, in some embodiments, file system engines may be arranged to subscribe to some components for receiving messages/notifications (those that support such a level of integration) while for other components file system engines may be configured to actively query or poll some components to obtain status updates, or the like.

In some cases, for some embodiments, the particular integration level with particular devices or components in the network may vary depending on the level integration supported or enabled by the particular devices or components.

Also, in some embodiments, file system engines may be arranged to employ services provided by operating systems to gather information about the performance or configuration for some network infrastructure. For example, in some cases, operating systems that may be hosting file system engines may provide access to various performance counters, such as datagrams/packets received, datagrams/packets sent, packets dropped, connection failures, network interface detection, or the like. Accordingly, in some embodiments, file system engines may be arranged to integrate file system operations with network infrastructure based on one or more performance counters received or monitored even if network infrastructure components do not support direct integration.

At flowchart block 904, in one or more of the various embodiments, file system engines may be arranged to determine one or more notification handlers based on the one or more notifications. In some embodiments, file system engines or networking engines may be arranged to be readily adaptable to various network devices or network components. Accordingly, in some embodiments, file system engines may include one or more handler libraries for integrating with various network infrastructure components. In some embodiments, network infrastructure component handlers may include rules, instructions, parsers, APIs, or the like, that enable integration with particular network infrastructure components.

Also, in some embodiments, file system engines may be arranged to include one or more file system operations handlers that include rules, instructions, or the like, for performing or initiating various file system operations in response to notifications or other circumstances associated with network infrastructure integration. Similar to network infrastructure component handlers, file system engines may be arranged to include one or more built-in operations handlers. Also, in some embodiments, file system engines may be arranged to load one or more operations handlers from configuration information to account for local circumstances or local requirements.

At flowchart block 906, in one or more of the various embodiments, file system engines may be arranged to execute one or more file system operations based on the one or more notifications.

In some embodiments, file system engines may be arranged to include one or more file system operation handlers that include rules, instructions, or the like, for performing or initiating various file system operations in response to notifications, status updates, or other circumstances associated with network infrastructure integration. Similar to network infrastructure component handlers, file system engines may be arranged to include one or more built-in operation handlers. Also, in some embodiments, file system engines may be arranged to load one or more operation handlers from configuration information to account for local circumstances or local requirements.

Next, in one or more of the various embodiments, control may be returned to a calling process.

Figure 10:
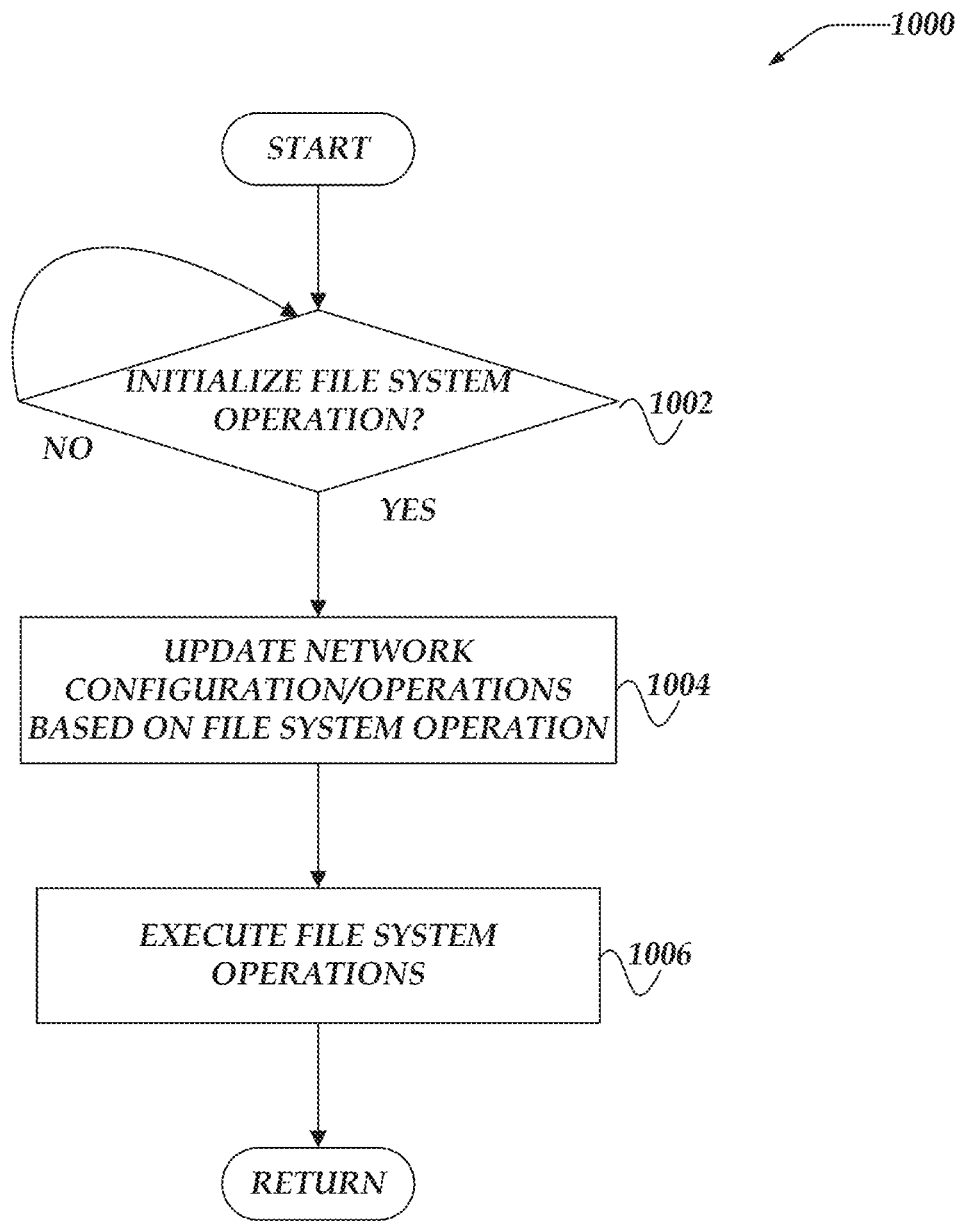
FIG. 10 illustrates a flowchart for a process for integrating file system operations with network infrastructure in accordance with one or more of the various embodiments.

FIG. 10 illustrates a flowchart for process 1000 for integrating file system operations with network infrastructure in accordance with one or more of the various embodiments. After a start flowchart block, at flowchart decision block 1002, in one or more of the various embodiments, if a file system engine may initialize one or more file system operations, control may flow to flowchart block 1004; otherwise, control may loop back to flowchart decision block 1002.

In some embodiments, file system engines may be arranged to actively adapt network infrastructure operations or configurations based on impending file system operations.

At flowchart block 1004, in one or more of the various embodiments, file system engines may be arranged to update or modify network configurations or network operations based on the one or more file system operations.

As described above, in some embodiments, file system engines may be arranged to include one or more file system operation handlers that may include rules, instructions, or the like, that may be responsive to communications or status updates associated with network infrastructure. Similarly, in some embodiments, one or more file system operation handlers may be configured to perform one or more actions to integrate with network infrastructure based on pending or impending file system operations. For example, in some embodiments, file system operation handlers may be configured to route file system traffic associated with particular file system operations over particular network interfaces, network paths/routes, or the like. Also, for example, in some embodiments, file system operation handlers may be configured to dynamically update configuration information for network infrastructure components depending on the impending or pending file system operations.

Accordingly, in some embodiments, file system engines may be configured to map one or more file system operations to particular file system operation handlers. Thus, in some embodiments, the file system operation handlers may employ the appropriate network infrastructure component handlers to execute the desired network infrastructure operations or configuration changes.

In some embodiments, file system engines may be arranged to enable one or more file system operations to be associated with file system operation handlers. In some embodiments, file system engines may be arranged to provide user interfaces that enable one or more file system operations to be associated with one or more network infrastructure configurations. In some cases, in some embodiments, particular file system operations may be associated with particular network infrastructure portions or network infrastructure components. For example, for some embodiments, one or more file system operations, such as replication operations, recovery activities, data rebalancing, particular reads or writes for particular file system clients, or the like, may be assigned to use particular network interfaces, switches, or the like. For example, if the network infrastructure includes network interfaces, switches, routes, or the like, that support different data transmission rates, critical file system operations may be assigned to the devices or paths that support higher throughput devices that may be used for more mundane tasks.

At flowchart block 1006, in one or more of the various embodiments, file system engines may be arranged to execute the one or more file system operations.

In some embodiments, if the network infrastructure may be configured, the file system engine may be arranged to execute the file system operation.

Next, in one or more of the various embodiments, control may be returned to a calling process.

Figure 11:
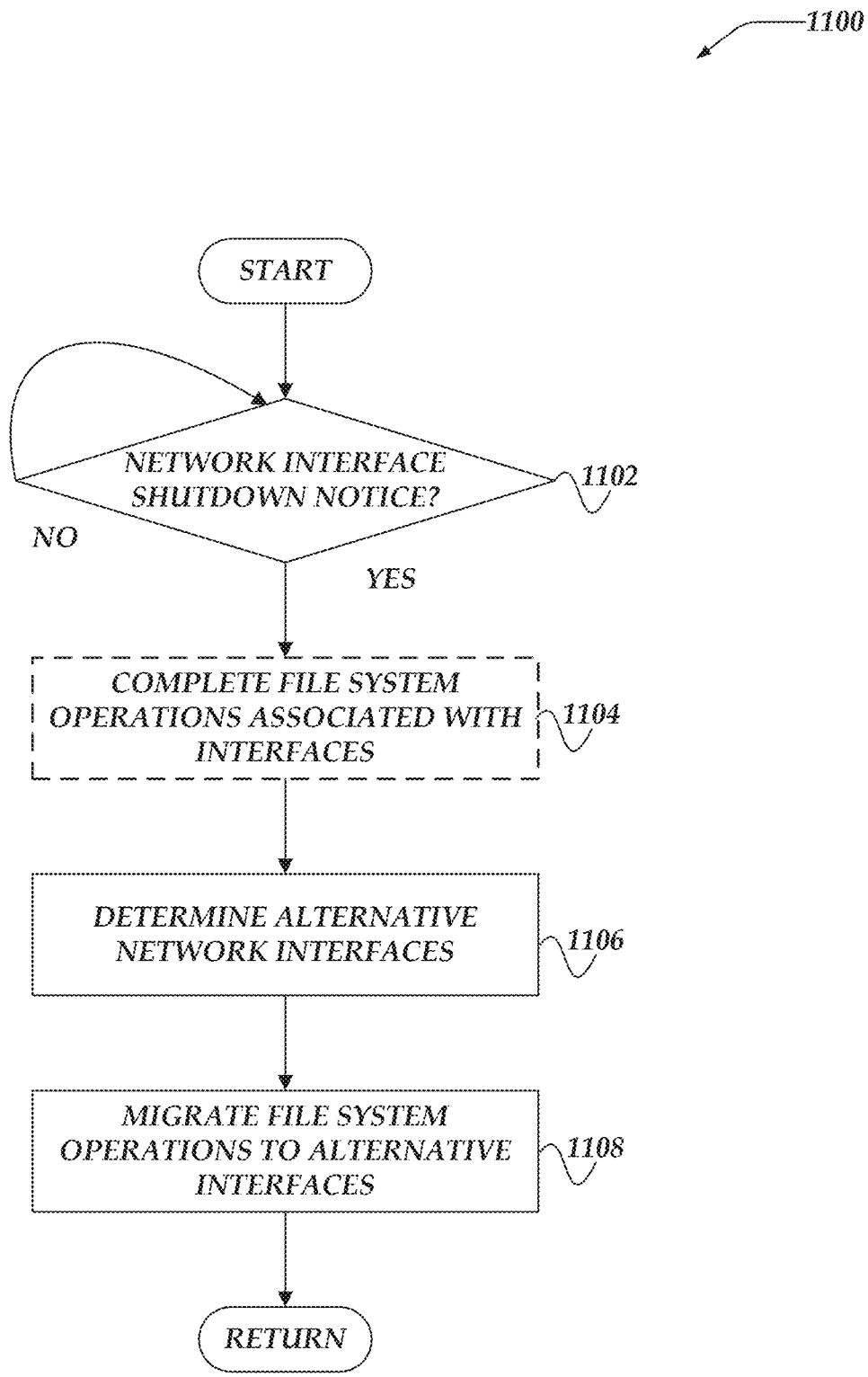
FIG. 11 illustrates a flowchart for a process for integrating file system operations with network infrastructure in accordance with one or more of the various embodiments.

FIG. 11 illustrates a flowchart for process 1100 for integrating file system operations with network infrastructure in accordance with one or more of the various embodiments. After a start flowchart block, at flowchart decision block 1102, in one or more of the various embodiments, if a file system engine may be provided a network interface shutdown notice, control may flow to flowchart block 1104; otherwise, control may loop back to flowchart decision block 1102.

In some cases, network infrastructure components may be removed from operations for various reasons. In some cases, components may be removed from network operations to enable scheduled maintenance or upgrades. Also, in some cases, one or more network devices may automatically detect error/failure conditions (e.g., high temperature, loss of main line power, communication failures/instability, or the like) such that they may be configured to send alerts or events to one or more registered listeners. Accordingly, in some embodiments, network infrastructure components may communicate alerts or messages that indicate that the network infrastructure components may be dropping out of service.

Accordingly, in some embodiments, file system engines may be arranged to include one or more component handlers that may be configured to receive or interpret the notifications, alerts, or messages sent by network infrastructure components.

Thus, in some embodiments, file system engines may be arranged to execute one or more network infrastructure configurations or operations before performing the particular file system operations.

At flowchart block 1104, in one or more of the various embodiments, optionally, file system engines may be arranged to complete one or more file system operations that may be associated with the one or more network interfaces.

In some embodiments, file system engines may be configured to perform one or more file system operations in response to receiving shutdown notices from network infrastructure components. In some embodiments, instructions or rules for performing the particular file system operations may be included in file system operation handlers. Accordingly, in some embodiments, different organizations may execute different file system operations depending on their local circumstances or local requirements. Further, in some embodiments, the particular file system operations may vary depending on the one or more of the details of the shutdown notices, the particular network infrastructure components, or the like. For example, for some embodiments, an organization may configure a file system operation handler to pause file system operations and wait for the network infrastructure component that may be shutting down to be brought back online. Also, for example, the organization may configure a file system operations handler to proactively reroute some or all network traffic for critical operations to avoid the network infrastructure component that may be going offline. For example, in some embodiments, a file system operations handler may be configured to direct traffic to another network interface, switch, or router to avoid the network infrastructure components that may be shutting down. Also, for example, for some embodiments, file system operation handlers may be configured to request that the shutdown be delayed (if possible) until one or more critical file system operations have completed.

Note, this flowchart block is indicated as being optional because in some cases, for some embodiments, there may be an absence of file system operations to perform.

At flowchart block 1106, in one or more of the various embodiments, file system engines may be arranged to determine one or more alternative network interfaces.

In some embodiments, file system node computers may be configured to access more than one network interface. Accordingly, in some embodiments, file system operation handlers may be configured to select one or more alternative network interfaces in response to determining that one or more of its current network interfaces may be going offline.

In some embodiments, selecting network interfaces, or the like, may include selecting different switches, hubs, routers, or the like, to effect the change in the network interfaces.

Note, one of ordinary skill in the art will appreciate that the innovations disclosed herein anticipate that file system engines or file system operation handlers may enable dynamic network infrastructure configuration modifications beyond selecting network interfaces or switches.

At flowchart block 1108, in one or more of the various embodiments, file system engines may be arranged to migrate file system operations to the one or more alternative network interfaces or network infrastructure components.

In some cases, for some embodiments, the shutdown notice may be permissive in that it may be delayed upon request. Accordingly, in some embodiments, file system engines or file system operation handlers may be configured to request a delay to enable one or more critical file system operations to complete without interruption. Thus, in some embodiments, file system engines may complete one or more pending critical operations before allowing the network infrastructure component to shutdown.

Also, in some cases, shutdown notices may be associated with mandatory or non-interruptible shutdowns. Accordingly, in some embodiments, file system engines may be arranged to immediately execute one or more responsive file system operations. Thus, in some embodiments, file system engines may take actions to reduce the impact of the infrastructure change. In some cases, for some embodiments, file system engines may proactively cancel or reset pending operations to avoid data loss. In other cases, depending on the capabilities of supporting network infrastructure, the file system engines may dynamically reroute operational traffic to alternative portions of the network infrastructure. In some cases, for some embodiments, file system engines may be arranged to selectively delay or cancel low priority file system operations in favor of critical operations.

In some embodiments, actions directed to mitigating the effects of the component shutdown may include initialing a dialogue with one or more network infrastructure components, such as switches, routers, or the like, to effect mitigation of the shutdown. For example, in some embodiments, file system engines may be arranged to query smart switches or other administrative components to request alternative network addresses, interface identifiers, alternative network gateways, or the like, that may be used to mitigate the effect of shutting down of the network infrastructure components associated with the shutdown notices.

Next, in one or more of the various embodiments, control may be returned to a calling process.

Figure 12:
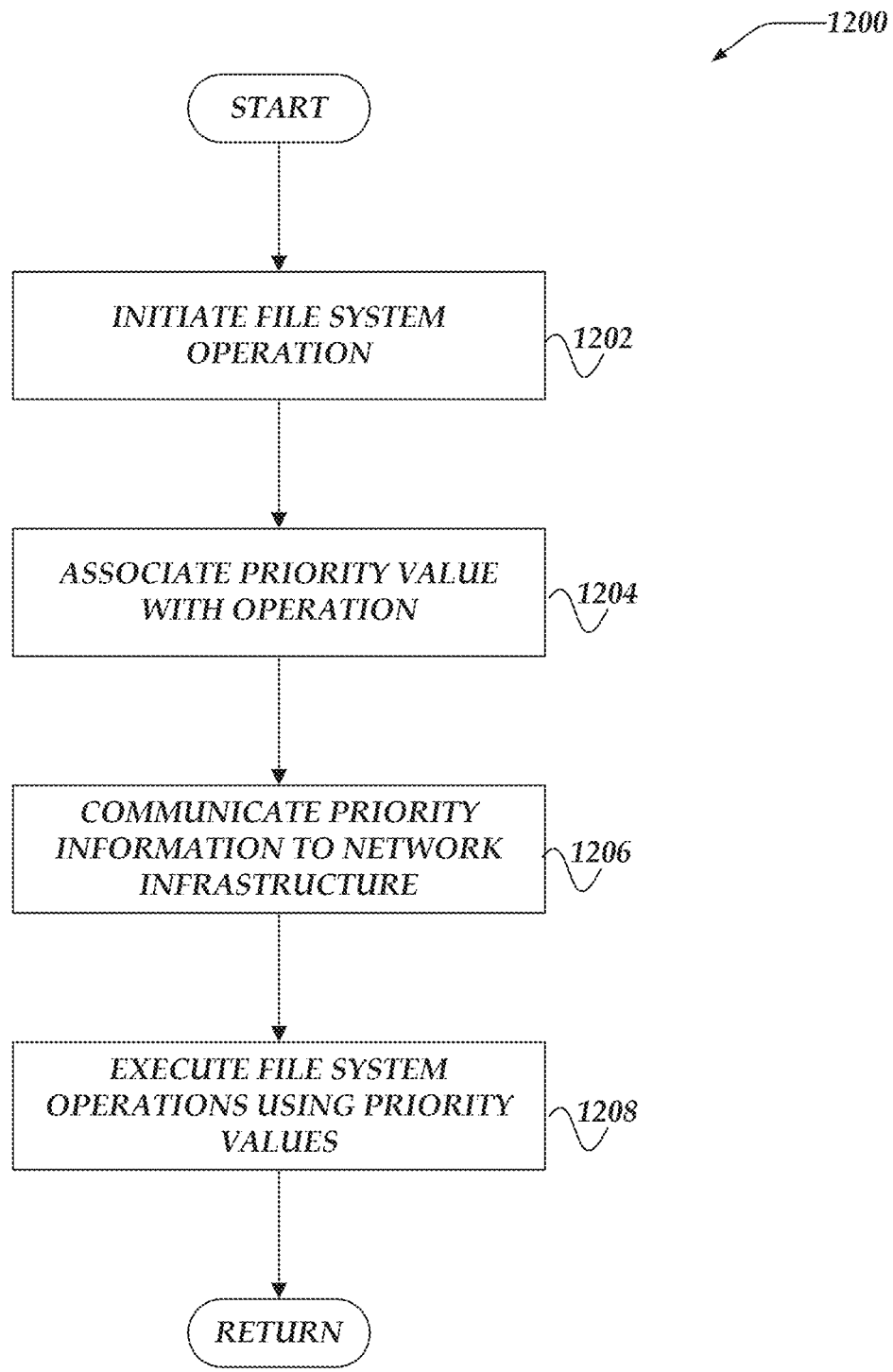
FIG. 12 illustrates a flowchart for a process for integrating file system operations with network infrastructure in accordance with one or more of the various embodiments.

FIG. 12 illustrates a flowchart for process 1200 for integrating file system operations with network infrastructure in accordance with one or more of the various embodiments. After a start flowchart block, at flowchart block 1202, in one or more of the various embodiments, file system engines may be arranged to initiate one or more file system operations. As described above, in some embodiments, file system engines may be arranged to perform various file system operations to operate or maintain a file system or distributed file system.

At flowchart block 1204, in one or more of the various embodiments, file system engines may be arranged to associate one or more priority values with the one or more file system operations.

In some cases, one or more particular file system operations may be considered more important or more critical than others. In some cases, for some embodiments, the importance or criticality of an operation may be inherent for some internal operations, such as recovery from storage device failures, preserving write data, or the like.

Further, in some embodiments, file system engines may be arranged to enable administrators or users to determine the importance of various file system operations based on local policies or local requirements. For example, in some embodiments, some file system administrators may desire to prioritize conventional read or writes for particular applications, clients, or the like. Likewise, in some cases, for some embodiments, file system administrators may prioritize or de-prioritize some types of file system operations depending on the time-of-day or day-of-week. For example, in some embodiments, file system engines may be arranged to enable file system administrators to implement QoS policies by assigning differentiated services codes to network traffic associated with particular file system operations.

In some embodiments, many file system operations, especially in distributed file systems, may depend on network traffic or network infrastructure. For example, in some embodiments, remote clients may send or receive or significant network traffic. Likewise, in some embodiments, internal/administrative file system operations, such as backup operations, data mirroring, data replication, data rebalancing, recovery operations, file system control plane communications, meta-data sharing, or the like, may depend on network infrastructure.

Also, in some embodiments, distributed file system may employ data protection schemes that distribute portions of files across different file system cluster nodes. For example, in some embodiments, as described at least in FIG. 5, a client may send a single write command that results in several internal network operations to distribute the data associated with write command to different file system cluster nodes.

Also, in some embodiments, file system engines may be arranged to associate a priority value or quality of service (QoS) value with network traffic associated with various file system operations. In some embodiments, file system engines may be arranged to enable file system administrators to customize the priorities based on their local requirements or local circumstances. Also, in some embodiments, file system engines may be arranged to assign one or more default priority values to particular file system operations. Accordingly, in some embodiments, file system engines may be arranged to provide user interfaces to enable file system administrators to assign priority values (e.g., differentiated services code points) to particular file system operations. Also, in some embodiments, file system engines may be arranged to determine priority value assignments based on configuration information that may be modified in support of local circumstances or local requirements.

In some embodiments, configuration information may associate one or more network components (e.g., ports, servers, other relevant network infrastructure) with one or more storage targets, priority values, or file system operations.

At flowchart block 1206, in one or more of the various embodiments, file system engines may be arranged to communicate the priority information to the network infrastructure.

As described above, file system engines may include networking engines that may facilitate communication with network infrastructure components. Accordingly, in some embodiments, file system engines may employ one or more component handlers to communicate priority value information to one or more network infrastructure components. One of ordinary skill in the art will appreciate that the mechanism for communicating network traffic priority information to network infrastructure components may vary depending on the particular network infrastructure component. Accordingly, in some embodiments, network infrastructure component handlers may include instructions specialized for particular network infrastructure components. For example, switch A may support a first API or communication protocol, while switch B may support a second API or a second communication protocol. However, as described above, file system engines may be arranged to be adaptable to different capabilities or communication methods of network infrastructure components by using specialized network infrastructure component handlers. Thus, in some embodiments, if a new or different network infrastructure component may be encountered, a specialized network infrastructure component handler may be provided to support the new or different component.

In some cases, some network infrastructure components that recognize or support priority values for network traffic may be configured to distrust remote or application level requests for priority. For example, if an application announces that its network traffic is high priority, some switches may ignore the priority announcement and use the switch's current understanding of priority values rather than following the application's priority request. Accordingly, in some embodiments, file system engines or networking engines may be arranged to integrate with the network infrastructure components directly rather than simply tagging file system operation network traffic with priority values.

Accordingly, in some embodiments, file system engines may be arranged to communicate with the relevant upstream network infrastructure components to effectively assign priority values to network traffic associated with file system operations that will be honored by upstream network infrastructure components.

At flowchart block 1208, in one or more of the various embodiments, file system engines may be arranged to execute one or more file system operations using the priority values.

In some embodiments, file system engines may be arranged to execute the file system operations that have been associated with the determined priority values. In some embodiments, this may include indicating or marking the network traffic associated with the file system operations based on the determined priority values. Accordingly, this may enable the network infrastructure to prioritize the network traffic associated with a given file system operation based on the indicated priority values. In some embodiments, both the network infrastructure and file system engines may be informed of priority values or priority configuration via one or more APIs or interfaces.

In some embodiments, if the priority values for the network traffic associated with file system operations may be communicated to the network infrastructure, the file system engines may continue executing the file system operations.

Next, in one or more of the various embodiments, control may be returned to a calling process.

Figure 13:
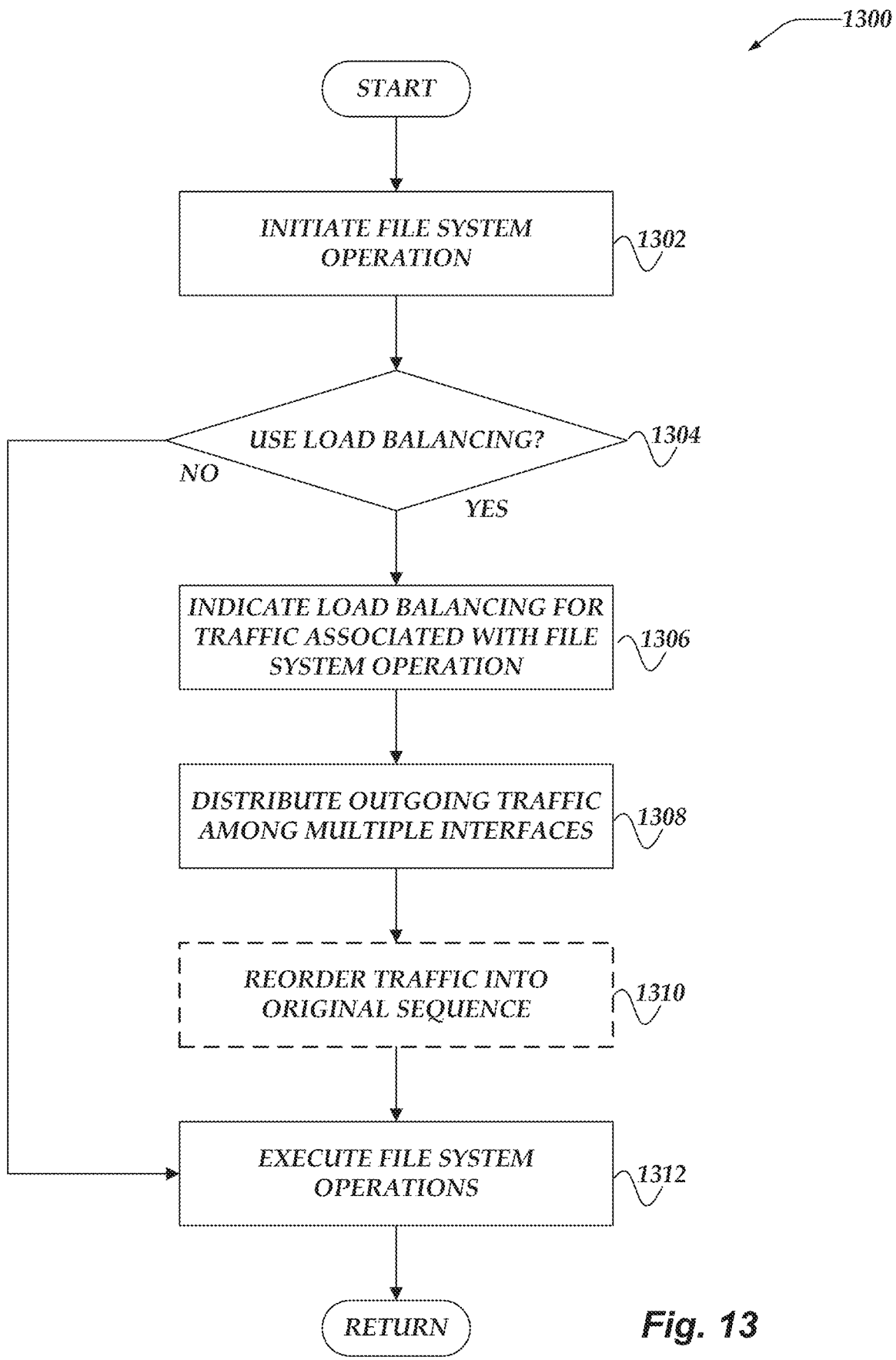
FIG. 13 illustrates a flowchart for a process for integrating file system operations with network infrastructure in accordance with one or more of the various embodiments.

FIG. 13 illustrates a flowchart for process 1300 for integrating file system operations with network infrastructure in accordance with one or more of the various embodiments. After a start flowchart block, at flowchart block 1302, in one or more of the various embodiments, file system engines may be arranged to initiate one or more file system operations.

As described above, in some embodiments, file system engines may be arranged to perform various file system operations to operate or maintain file systems or distributed file systems.

At flowchart decision block 1304, in one or more of the various embodiments, if load balancing may be employed, control may flow to flowchart block 1306; otherwise, control may flow to flowchart block 1312. In some embodiments, file system engines may be arranged to determine that some or all network traffic associated with one or more file system operations may be eligible for load balancing. For example, in some embodiments, file system engines may be configured with one or more file system operation handlers that may determine if the network traffic associated with particular file system operations may be load balanced including using packet spraying from leaf switches to one or more spine switches. Note, similarly, in some embodiments, file system engines may be configured to pin some or all network traffic associated with particular file system operation to particular network interfaces, data uplinks, spine switches, or the like.

Further, in some cases, for some embodiments, file system engines may be arranged to load balance network traffic associated with file system operation by selectively determining how network traffic from leaf switches that may be connected to file system nodes may be distributed among spine switches that may be part of the network infrastructure. In some embodiments, file system engines may be arranged to communicate via APIs or other interfaces with the network infrastructure to activate one or more load balancing policies within the network infrastructure.

At flowchart block 1306, in one or more of the various embodiments, file system engines may be arranged to indicate that load balancing for network traffic associated with the one or more file system operations.

In some embodiments, file system engines may be arranged to configure one or more network infrastructure components to employ one or more load balancing schemes for network traffic associated with particular file system operations. In some embodiments, file system engines may be arranged to communicate one or more configuration settings to one or more network infrastructure components. In some embodiments, file system engines may be arranged to employ specialized network infrastructure component handlers to execute the correct API calls for the relevant network infrastructure components or enable communication of the correct parameters with the relevant network infrastructure components.

In some embodiments, file system engines acting as a cluster controller may be configured to establish load balancing policy for the entire cluster such that the cluster controller may set the policy in advance. However, in some cases, file system controller nodes or individual file system nodes may be enabled to dynamically set load balancing policy for various network traffic that may be associated with particular file system operations.

At flowchart block 1308, in one or more of the various embodiments, file system engines may be arranged to distribute the outgoing network traffic to one or more network interfaces.

In some embodiments, file system engines may be arranged to conduct the impending or pending file system operations. In some embodiments, a networking engine or network infrastructure component handler may be arranged to execute the particular instructions for enabling the particular load balancing policy. For example, in some embodiments, initiating a packet spray policy may require including or setting one or more specialized field values in the network traffic datagrams. Likewise, for example, activating the desired load balancing policy may include communicating commands to one or more network infrastructure components directly before sending the relevant network traffic.

At flowchart block 1310, in one or more of the various embodiments, optionally, file system engines may be arranged to reorder the network traffic into its original sequence.

In some cases, for some embodiments, load balancing policies may result in network traffic datagrams arriving out of order. Accordingly, in some embodiments, file system engines (or networking engines) may be arranged to cache or buffer out-of-order datagrams to enable reordering them into the correct order before interpreting them for file system operations.

In some embodiments, depending on capabilities of the particular network infrastructure components involved in the load balancing, file system engines may be arranged to enable the network infrastructure components to perform the reordering. In some embodiments, for some components this may include sending configuration commands or other control commands to enable reordering at network infrastructure components. Accordingly, in some embodiments, datagrams may be delivered to file system engines in the correct order after the relevant network infrastructure component has reordered any out of order datagrams.

Note, this flowchart block is indicated as being optional because in some cases the file system engines may be sending network traffic such that re-ordering may be the unnecessary.

At flowchart block 1312, in one or more of the various embodiments, file system engines may be arranged to execute the one or more file system operations.

In some embodiments, file system engines may be arranged to process the network traffic to perform the file system operations associated with the network traffic whether sending or receiving the network traffic.

Next, in one or more of the various embodiments, control may be returned to a calling process.

Figure 14:
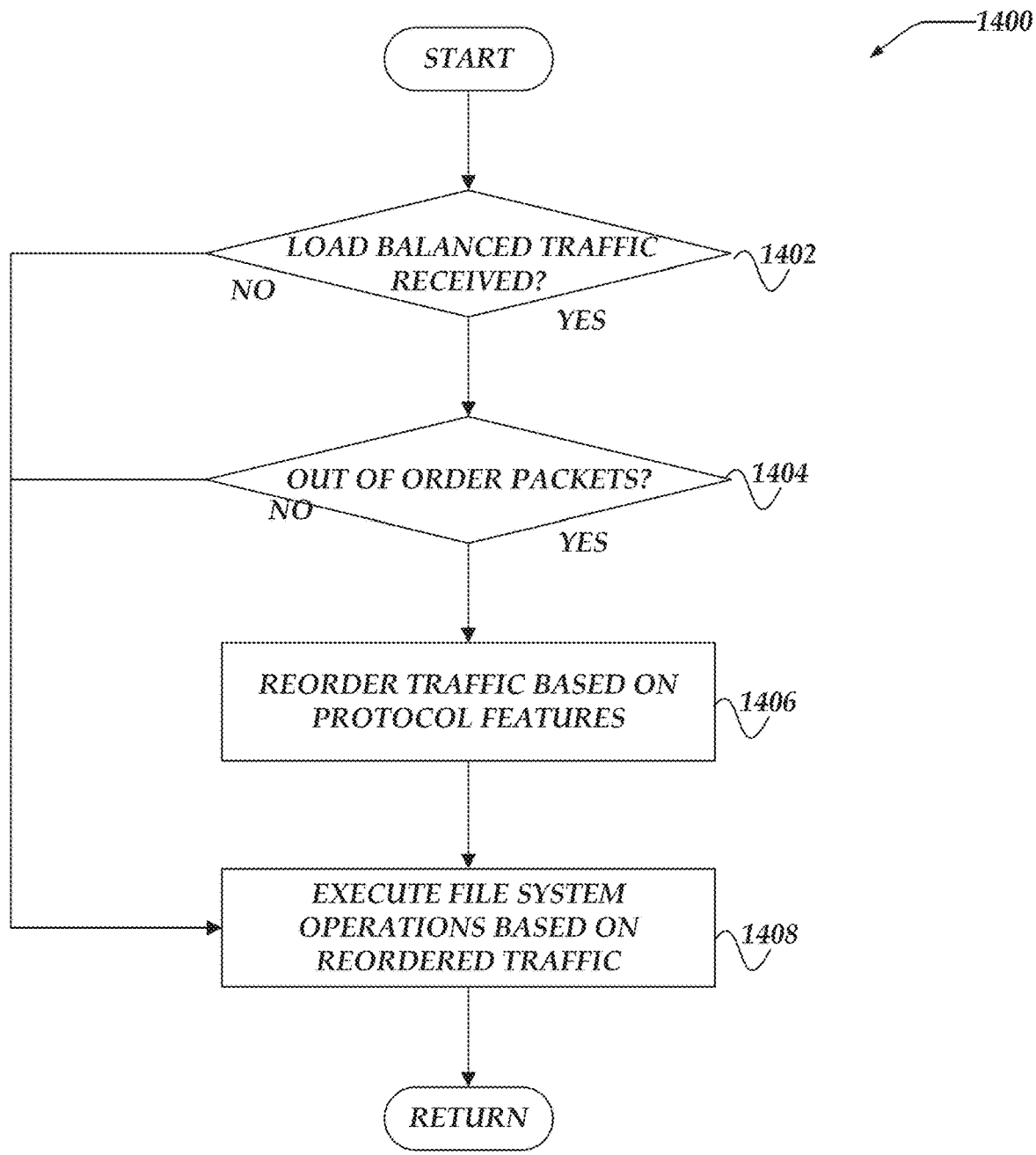
FIG. 14 illustrates a flowchart for a process for integrating file system operation with network infrastructure in accordance with one or more of the various embodiments.

FIG. 14 illustrates a flowchart for process 1400 for integrating file system operation with network infrastructure in accordance with one or more of the various embodiments. After a start flowchart block, at flowchart decision block 1402, in one or more of the various embodiments, if networking engines may be provided load balanced network traffic, control may flow to flowchart decision block 1404; otherwise, control may flow to flowchart block 1410. As described above, in some embodiments, file system engines may be arranged to dynamically determine load balancing policy for network traffic associated with particular file system operations.

At flowchart decision block 1404, in one or more of the various embodiments, if there may be out of order network packets, control may flow to flowchart block 1406; otherwise, control may flow to flowchart block 1406. In some cases, for some embodiments, datagrams associated with load balanced network traffic may be received out of order. In some embodiments, file system engines or networking engines (including portions of logical networking engines that may be hosted on network infrastructure components) may employ features of the underlying network protocol or application protocols to identify if datagrams may be received out of order. For example, in some embodiments, datagrams may be associated with sequence numbers that may be employed to confirm the correct ordering or datagrams.

At flowchart block 1406, in one or more of the various embodiments, networking engines may be arranged to reorder the network traffic based on one or more protocol features associated with the network traffic. For example, in some embodiments, file system engines or networking engines may be arranged to reorder out of order datagrams based on sequence numbers included in the received datagrams.

At flowchart block 1408, in one or more of the various embodiments, the file system engines may be arranged to execute one or more file system operations based on the reordered network traffic.

Next, in one or more of the various embodiments, control may be returned to a calling process.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors to execute instructions that are configured to cause performance of actions, comprising:

executing a plurality of file system operations in the file system based on one or more of a file system client action or a file system administrative action, wherein the file system is integrated with an infrastructure of the network that includes a plurality of network devices; and employing one or more messages associated with one or more of the plurality of network devices to perform further actions, including:

determining one or more of the plurality of file system operations that are associated with the one or more network devices based on the one or more messages;

modifying the infrastructure associated with the one or more network devices in response to the one or more messages or the one or more file system operations, wherein the modification includes performing additional actions, comprising:

reconfiguring reconfiguration of the one or more network devices to adapt to one or more of a file system operation or a performance consideration for the file system;

determining network traffic directed to one or more target destinations, wherein the network traffic is associated with the one or more file system operations;

determining one or more paths to the one or more target destinations in the infrastructure based on the one or more network devices;

assigning one or more portions of the network traffic to the one or more paths based on one or more metrics, wherein the one or more metrics include one or more of a hop count metric, a latency metric, a utilization metric, an error rate metric, or a packet size metric; and communicating the one or more portions of the network traffic to the one or more target destinations over the assigned paths in the infrastructure; and modifying the one or more file system operations to adapt to the modified infrastructure with the one or more reconfigured network devices, wherein one or more of a plurality of datagrams that are out of a correct order and correspond to the one or more file system operations are reordered into the correct order; and executing the one or more modified file system operations.

2. The method of claim 1, wherein modifying the infrastructure further comprises:

determining one or more network interfaces associated with the one or more network devices based on the one or more messages, wherein the one or more network interfaces communicate network traffic associated with the one or more file system operations, and wherein the one or more messages indicate an impending shutdown of the one or more network interfaces;

determining one or more other network interfaces based on the one or more the network devices and the one or more file system operations; and communicating the network traffic associated with the one or more file system operations using the one or more other network interfaces.

3. The method of claim 1, wherein modifying the infrastructure further comprises:

determining network traffic directed to one or more target destinations, wherein the network traffic is associated with the one or more file system operations;

determining two or more equal cost paths to the one or more target destinations in the infrastructure based on the one or more network devices; and communicating the one or more portions of the network traffic to the one or more target destinations over the two or more equal cost paths, wherein the one or more portions of the network traffic are randomly distributed across the two or more equal cost paths.

4. The method of claim 1, wherein modifying the one or more file system operations, further comprises:

determining network traffic directed to one or more target destinations, wherein the network traffic is associated with the one or more file system operations;

associating one or more priority values with one or more portions of the network traffic based on the one or more file system operations, wherein the one or more network devices prioritize the one or more portions of the network traffic based on the one or more priority values.

5. The method of claim 1, wherein executing the plurality of file system operations, further comprises:

executing one or more of a file system client request, a file system backup operation, a file system recovery operation, a meta-data update operation, a snapshot operation, a data protection operation, a data pre-fetch operation, a data mirroring operation, a data replication operation, a rebalancing operation, a proactive data update operation, or a notification or message operation.

6. The method of claim 1, further comprising:

generating one or more queries based on one or more impending file system operations, wherein the one or more queries are communicated to a portion of the plurality of network devices;

modifying one or more portions of the infrastructure based on one or more responses associated with the one or more queries; and executing the one or more impending file system operations in the one or more modified portions of the infrastructure.

7. The method of claim 1, wherein the plurality of network devices include one or more of a network interface, a network switch, a hub, a network bridge, a router, an access point, a load balancer, a modem, a gateway, or a firewall.

8. A system for managing data in a file system over a network, comprising:

a network computer, comprising:
 a memory that stores at least instructions; and
 one or more processors that execute instructions that are configured to cause performance of actions, including:
  executing a plurality of file system operations in the file system based on one or more of a file system client action or a file system administrative action, wherein the file system is integrated with an infrastructure of the network that includes a plurality of network devices; and
 employing one or more messages associated with one or more of the plurality of network devices to perform further actions, including:
  determining one or more of the plurality of file system operations that are associated with the one or more network devices based on the one or more messages;
  modifying the infrastructure associated with the one or more network devices in response to the one or more messages or the one or more file system operations, wherein the modification includes performing additional actions, comprising:
   reconfiguring reconfiguration of the one or more network devices to adapt to one or more of a file system operation or a performance consideration for the file system;
   determining network traffic directed to one or more target destinations, wherein the network traffic is associated with the one or more file system operations;
   determining one or more paths to the one or more target destinations in the infrastructure based on the one or more network devices;
   assigning one or more portions of the network traffic to the one or more paths based on one or more metrics, wherein the one or more metrics include one or more of a hop count metric, a latency metric, a utilization metric, an error rate metric, or a packet size metric; and
   communicating the one or more portions of the network traffic to the one or more target destinations over the assigned paths in the infrastructure; and
  modifying the one or more file system operations to adapt to the modified infrastructure with the one or more reconfigured network devices, wherein one or more of a plurality of datagrams that are out of a correct order and correspond to the one or more file system operations are reordered into the correct order; and
  executing the one or more modified file system operations; and one or more client computers, comprising:
 a memory that stores at least instructions; and
 one or more processors that execute instructions that are configured to cause performance of other actions, including:
  communicating one or more requests to initiate the one or more file system operations.

9. The system of claim 8, wherein modifying the infrastructure further comprises:

determining one or more network interfaces associated with the one or more network devices based on the one or more messages, wherein the one or more network interfaces communicate network traffic associated with the one or more file system operations, and wherein the one or more messages indicate an impending shutdown of the one or more network interfaces;

determining one or more other network interfaces based on the one or more the network devices and the one or more file system operations; and communicating the network traffic associated with the one or more file system operations using the one or more other network interfaces.

10. The system of claim 8, wherein modifying the infrastructure further comprises:
   determining network traffic directed to one or more target destinations, wherein the network traffic is associated with the one or more file system operations;
   determining two or more equal cost paths to the one or more target destinations in the infrastructure based on the one or more network devices; and
   communicating the one or more portions of the network traffic to the one or more target destinations over the two or more equal cost paths, wherein the one or more portions of the network traffic are randomly distributed across the two or more equal cost paths.

11. The system of claim 8, wherein modifying the one or more file system operations, further comprises:
   determining network traffic directed to one or more target destinations, wherein the network traffic is associated with the one or more file system operations;
   associating one or more priority values with one or more portions of the network traffic based on the one or more file system operations, wherein the one or more network devices prioritize the one or more portions of the network traffic based on the one or more priority values.

12. The system of claim 8, wherein executing the plurality of file system operations, further comprises:
   executing one or more of a file system client request, a file system backup operation, a file system recovery operation, a meta-data update operation, a snapshot operation, a data protection operation, a data pre-fetch operation, a data mirroring operation, a data replication operation, a rebalancing operation, a proactive data update operation, or a notification or message operation.

13. The system of claim 8, wherein the one or more network computer processors execute instructions that are configured to cause performance of actions, further comprising:
   generating one or more queries based on one or more impending file system operations, wherein the one or more queries are communicated to a portion of the plurality of network devices;
   modifying one or more portions of the infrastructure based on one or more responses associated with the one or more queries; and
   executing the one or more impending file system operations in the one or more modified portions of the infrastructure.

14. The system of claim 8, wherein the plurality of network devices include one or more of a network interface, a network switch, a hub, a network bridge, a router, an access point, a load balancer, a modem, a gateway, or a firewall.

15. A processor readable non-transitory storage media that includes instructions for managing data in a file system over a network, wherein execution of the instructions by one or more processors on one or more network computers performs actions, comprising:
   executing a plurality of file system operations in the file system based on one or more of a file system client action or a file system administrative action, wherein the file system is integrated with an infrastructure of the network that includes a plurality of network devices; and
   employing one or more messages associated with one or more of the plurality of network devices to perform further actions, including:
      determining one or more of the plurality of file system operations that are associated with the one or more network devices based on the one or more messages;
      modifying the infrastructure associated with the one or more network devices in response to the one or more messages or the one or more file system operations, wherein the modification includes performing additional actions, comprising:
   reconfiguring reconfiguration of the one or more network devices to adapt to one or more of a file system operation or a performance consideration for the file system;
   determining network traffic directed to one or more target destinations, wherein the network traffic is associated with the one or more file system operations:
   determining one or more paths to the one or more target destinations in the infrastructure based on the one or more network devices;
   assigning one or more portions of the network traffic to the one or more paths based on one or more metrics, wherein the one or more metrics include one or more of a hop count metric, a latency metric, a utilization metric, an error rate metric, or a packet size metric; and
   communicating the one or more portions of the network traffic to the one or more target destinations over the assigned paths in the infrastructure; and
   modifying the one or more file system operations to adapt to the modified infrastructure with the one or more reconfigured network devices, wherein one or more of a plurality of datagrams that are out of a correct order and correspond to the one or more file system operations are reordered into the correct order; and
      executing the one or more modified file system operations.

16. The media of claim 15, wherein modifying the infrastructure further comprises:
   determining one or more network interfaces associated with the one or more network devices based on the one or more messages, wherein the one or more network interfaces communicate network traffic associated with the one or more file system operations, and wherein the one or more messages indicate an impending shutdown of the one or more network interfaces;
   determining one or more other network interfaces based on the one or more the network devices and the one or more file system operations; and
   communicating the network traffic associated with the one or more file system operations using the one or more other network interfaces.

17. The media of claim 15, wherein modifying the infrastructure further comprises:
   determining network traffic directed to one or more target destinations, wherein the network traffic is associated with the one or more file system operations;
   determining two or more equal cost paths to the one or more target destinations in the infrastructure based on the one or more network devices; and
   communicating the one or more portions of the network traffic to the one or more target destinations over the two or more equal cost paths, wherein the one or more portions of the network traffic are randomly distributed across the two or more equal cost paths.

18. The media of claim 15, wherein modifying the one or more file system operations, further comprises:
   determining network traffic directed to one or more target destinations, wherein the network traffic is associated with the one or more file system operations;

associating one or more priority values with one or more portions of the network traffic based on the one or more file system operations, wherein the one or more network devices prioritize the one or more portions of the network traffic based on the one or more priority values.

19. The media of claim 15, wherein executing the plurality of file system operations, further comprises:
executing one or more of a file system client request, a file system backup operation, a file system recovery operation, a meta-data update operation, a snapshot operation, a data protection operation, a data pre-fetch operation, a data mirroring operation, a data replication operation, a rebalancing operation, a proactive data update operation, or a notification or message operation.

20. The media of claim 15, wherein the plurality of network devices include one or more of a network interface, a network switch, a hub, a network bridge, a router, an access point, a load balancer, a modem, a gateway, or a firewall.

21. A network computer for managing data in a file system over a network, comprising:
a memory that stores at least instructions; and
one or more processors that execute instructions that are configured to cause performance of actions, including:
executing a plurality of file system operations in the file system based on one or more of a file system client action or a file system administrative action, wherein the file system is integrated with an infrastructure of the network that includes a plurality of network devices; and
employing one or more messages associated with one or more of the plurality of network devices to perform further actions, including:
determining one or more of the plurality of file system operations that are associated with the one or more network devices based on the one or more messages;
modifying the infrastructure associated with the one or more network devices in response to the one or more messages or the one or more file system operations, wherein the modification includes performing additional actions, comprising:
reconfiguring reconfiguration of the one or more network devices to adapt to one or more of a file system operation or a performance consideration for the file system;
determining network traffic directed to one or more target destinations, wherein the network traffic is associated with the one or more file system operations;
determining one or more paths to the one or more target destinations in the infrastructure based on the one or more network devices;
assigning one or more portions of the network traffic to the one or more paths based on one or more metrics, wherein the one or more metrics include one or more of a hop count metric, a latency metric, a utilization metric, an error rate metric, or a packet size metric; and
communicating the one or more portions of the network traffic to the one or more target destinations over the assigned paths in the infrastructure; and
modifying the one or more file system operations to adapt to the modified infrastructure with the one or more reconfigured network devices, wherein one or more of a plurality of datagrams that are out of a correct order and correspond to the one or more file system operations are reordered into the correct order; and
executing the one or more modified file system operations.

22. The network computer of claim 21, wherein modifying the infrastructure further comprises:
determining one or more network interfaces associated with the one or more network devices based on the one or more messages, wherein the one or more network interfaces communicate network traffic associated with the one or more file system operations, and wherein the one or more messages indicate an impending shutdown of the one or more network interfaces;
determining one or more other network interfaces based on the one or more the network devices and the one or more file system operations; and
communicating the network traffic associated with the one or more file system operations using the one or more other network interfaces.

23. The network computer of claim 21, wherein modifying the infrastructure further comprises:
determining network traffic directed to one or more target destinations, wherein the network traffic is associated with the one or more file system operations;
determining two or more equal cost paths to the one or more target destinations in the infrastructure based on the one or more network devices; and
communicating the one or more portions of the network traffic to the one or more target destinations over the two or more equal cost paths, wherein the one or more portions of the network traffic are randomly distributed across the two or more equal cost paths.

24. The network computer of claim 21, wherein modifying the one or more file system operations, further comprises:
determining network traffic directed to one or more target destinations, wherein the network traffic is associated with the one or more file system operations;
associating one or more priority values with one or more portions of the network traffic based on the one or more file system operations, wherein the one or more network devices prioritize the one or more portions of the network traffic based on the one or more priority values.

25. The network computer of claim 21, wherein executing the plurality of file system operations, further comprises: executing one or more of a file system client request, a file system backup operation, a file system recovery operation, a meta-data update operation, a snapshot operation, a data protection operation, a data pre-fetch operation, a data mirroring operation, a data replication operation, a rebalancing operation, a proactive data update operation, or a notification or message operation.

26. The network computer of claim 21, wherein the one or more processors execute instructions that are configured to cause performance of actions, further comprising
generating one or more queries based on one or more impending file system operations, wherein the one or more queries are communicated to a portion of the plurality of network devices;
modifying one or more portions of the infrastructure based on one or more responses associated with the one or more queries; and
executing the one or more impending file system operations in the one or more modified portions of the infrastructure.

* * * * *